United States Patent
Hosseini et al.

(10) Patent No.: US 11,589,403 B2
(45) Date of Patent: Feb. 21, 2023

(54) UPLINK POWER CONTROL PRIORITIZATION IN DUAL CONNECTIVITY

(71) Applicant: QUALCOMM Incorporated, San Diego, CA (US)

(72) Inventors: Seyedkianoush Hosseini, San Diego, CA (US); Peter Gaal, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/799,654

(22) Filed: Feb. 24, 2020

(65) Prior Publication Data
US 2020/0275504 A1    Aug. 27, 2020

Related U.S. Application Data

(60) Provisional application No. 62/810,368, filed on Feb. 25, 2019.

(51) Int. Cl.
*H04W 76/15*    (2018.01)
*H04W 72/04*    (2009.01)
(Continued)

(52) U.S. Cl.
CPC ....... *H04W 76/15* (2018.02); *H04W 72/0473* (2013.01); *H04W 72/10* (2013.01); *H04W 72/1268* (2013.01); *H04W 84/20* (2013.01)

(58) Field of Classification Search
CPC . H04W 72/0473; H04W 76/15; H04W 72/10; H04W 7/1268; H04W 84/20;
(Continued)

(56) References Cited

U.S. PATENT DOCUMENTS

2015/0215943 A1   7/2015 Vajapeyam et al.
2017/0013564 A1*  1/2017 Yi ........................... H04W 52/36
(Continued)

FOREIGN PATENT DOCUMENTS

EP    3209069 A1    8/2017
EP    3641453 A1    4/2020
(Continued)

OTHER PUBLICATIONS

Panasonic, "Uplink Power Control for Supporting NR-NR Dual-Connectivity", Jan. 25, 2019, 3GPP Tsg Ran WG2 Ad-Hoc Meeting 1901, R1-1900699, pp. 1-3. (Year: 2019).*
(Continued)

*Primary Examiner* — Robert C Scheibel
(74) *Attorney, Agent, or Firm* — Holland & Hart LLP/Qualcomm Incorporated

(57) ABSTRACT

Methods, systems, and devices for wireless communication are described. Generally, the described techniques provide for efficiently performing dynamic power control with minimal complexity in a dual connectivity mode. In particular, a user equipment (UE) may determine the reserved power (or maximum available power) for uplink transmissions on one or more cells in one cell group to a base station based on the total power available to the UE and the minimum reserved power for uplink transmissions on one or more cells in another cell group. Once the UE determines the reserved power for conflicting uplink transmissions on one or more cells in a cell group, the UE may allocate the reserved power to each uplink transmission on the one or more cells in the cell group (e.g., based on a priority of each of the uplink transmissions).

30 Claims, 9 Drawing Sheets

(51) Int. Cl.
*H04W 72/12* (2009.01)
*H04W 72/10* (2009.01)
*H04W 84/20* (2009.01)
*H04W 72/044* (2023.01)
*H04W 72/1268* (2023.01)

(58) Field of Classification Search
CPC . H04W 52/34; H04W 52/146; H04W 52/281; H04W 52/367
See application file for complete search history.

(56) References Cited

U.S. PATENT DOCUMENTS

| | | | |
|---|---|---|---|
| 2017/0164299 A1* | 6/2017 | Shimezawa | H04W 52/16 |
| 2018/0279229 A1 | 9/2018 | Dinan et al. | |
| 2019/0007948 A1 | 1/2019 | Vajapeyam et al. | |
| 2019/0208478 A1* | 7/2019 | Park | H04W 76/27 |
| 2019/0223115 A1* | 7/2019 | Chen | H04W 52/146 |
| 2020/0163023 A1* | 5/2020 | Pelletier | H04W 72/042 |
| 2020/0205085 A1* | 6/2020 | Li | H04B 7/0682 |

FOREIGN PATENT DOCUMENTS

| | | |
|---|---|---|
| WO | WO-2018228564 A1 | 12/2018 |
| WO | WO-2018232245 A1 | 12/2018 |

OTHER PUBLICATIONS

International Search Report and Written Opinion—PCT/US2020/019757—ISA/EOI—dated May 29, 2020.
NTT DOCOMO: "Power-Control Mechanisms for Dual Connectivity", 3GPP Draft, 3GPP TSG RAN WG1 Meeting #77, R1-142264, 3rd Generation Partnership Project (3GPP), Mobile Competence Centre, 650, Route Des Lucioles, F-06921, Sophia-Antipolis Cedex, France, vol. RAN WG1, No. Seoul, Korea, May 19, 2014-May 23, 2014, May 18, 2014 May 18, 2014), XP050787858, 8 Pages, Retrieved from the Internet: URL: http://www.3gpp.org/ftp/Meetings_3GPP_SYNC/RAN1/Docs/ [retrieved on May 18, 2014] p. 3, line 1—p. 4, line 2; figure 3 p. 4, line 22—p. 5, line 7; figure 4.

* cited by examiner

UPLINK POWER CONTROL PRIORITIZATION IN DUAL CONNECTIVITY

CROSS REFERENCE

The present Application for Patent claims the benefit of U.S. Provisional Patent Application No. 62/810,368 by HOSSEINI et al., entitled "UPLINK POWER CONTROL PRIORITIZATION IN DUAL CONNECTIVITY," filed Feb. 25, 2019, assigned to the assignee hereof, and expressly incorporated by reference herein.

BACKGROUND

The following relates generally to wireless communications and more specifically to uplink power control prioritization in dual connectivity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a user equipment (UE) may be configured to operate in a dual connectivity mode where the UE may communicate with two or more base stations. In such systems, the UE may be scheduled to simultaneously transmit uplink signals (e.g., data, control, or reference signals) to multiple base stations each associated with a cell group (i.e., one or more cells on which the base station may communicate with a UE). In some cases, however, a UE operating in a dual connectivity mode may be power limited (i.e., the UE may only have a limited amount of power for transmitting uplink signals), and it may be challenging for the UE to determine how to allocate power for simultaneous uplink transmissions to multiple base stations.

SUMMARY

The described techniques relate to improved methods, systems, devices, and apparatuses that support uplink power control prioritization in dual connectivity. Generally, the described techniques provide for efficiently performing dynamic power control in a dual connectivity mode. In particular, a user equipment (UE) may determine the reserved power (or maximum available power) for uplink transmissions on one or more cells in one cell group to a base station based on the total power available to the UE and the minimum reserved power for conflicting uplink transmissions on one or more cells in another cell group. Once the UE determines the reserved power for uplink transmissions on one or more cells in a cell group, the UE may allocate the reserved power to each uplink transmission on the one or more cells in the cell group (e.g., based on a priority of each of the uplink transmissions). Power is allocated to the uplink transmissions, with priority given to ultra-reliable low-latency communications.

A method for wireless communication at a UE is described. The method may include identifying that the UE is operating in dual connectivity with a master cell group and a secondary cell group, determining a secondary cell group reserved transmission power for allocation across component carriers of the secondary cell group during a transmission occasion based on a secondary cell group minimum reserved transmission power for transmissions from the UE to the secondary cell group during the transmission occasion, allocating a master cell group reserved transmission power between scheduled transmissions to the master cell group during the transmission occasion based on the secondary cell group reserved transmission power and a channel type priority, allocating the secondary cell group reserved transmission power between scheduled transmissions to the secondary cell group during the transmission occasion, and communicating with the master cell group and with the secondary cell group in accordance with the power allocations.

An apparatus for wireless communication at a UE is described. The apparatus may include a processor, memory coupled with the processor, and instructions stored in the memory. The instructions may be executable by the processor to cause the apparatus to identify that the UE is operating in dual connectivity with a master cell group and a secondary cell group, determine a secondary cell group reserved transmission power for allocation across component carriers of the secondary cell group during a transmission occasion based on a secondary cell group minimum reserved transmission power for transmissions from the UE to the secondary cell group during the transmission occasion, allocate a master cell group reserved transmission power between scheduled transmissions to the master cell group during the transmission occasion based on the secondary cell group reserved transmission power and a channel type priority, allocate the secondary cell group reserved transmission power between scheduled transmissions to the secondary cell group during the transmission occasion, and communicate with the master cell group and with the secondary cell group in accordance with the power allocations.

Another apparatus for wireless communication at a UE is described. The apparatus may include means for identifying that the UE is operating in dual connectivity with a master cell group and a secondary cell group, determining a secondary cell group reserved transmission power for allocation across component carriers of the secondary cell group during a transmission occasion based on a secondary cell group minimum reserved transmission power for transmissions from the UE to the secondary cell group during the transmission occasion, allocating a master cell group reserved transmission power between scheduled transmissions to the master cell group during the transmission occasion based on the secondary cell group reserved transmission power and a channel type priority, allocating the secondary cell group reserved transmission power between scheduled transmissions to the secondary cell group during the transmission occasion, and communicating with the master cell group and with the secondary cell group in accordance with the power allocations.

A non-transitory computer-readable medium storing code for wireless communication at a UE is described. The code may include instructions executable by a processor to identify that the UE is operating in dual connectivity with a master cell group and a secondary cell group, determine a secondary cell group reserved transmission power for allocation across component carriers of the secondary cell group during a transmission occasion based on a secondary cell group minimum reserved transmission power for transmissions from the UE to the secondary cell group during the transmission occasion, allocate a master cell group reserved transmission power between scheduled transmissions to the master cell group during the transmission occasion based on the secondary cell group reserved transmission power and a channel type priority, allocate the secondary cell group reserved transmission power between scheduled transmissions to the secondary cell group during the transmission occasion, and communicate with the master cell group and with the secondary cell group in accordance with the power allocations.

In some examples of the method, apparatuses, and non-transitory computer-readable medium described herein, the channel type priority includes at least one of a non-ultra-reliable low-latency communication with the master cell group, an ultra-reliable low-latency communication with the secondary cell group, or an ultra-reliable low-latency communication with the master cell group.

Some examples of the method, apparatuses, and non-transitory computer-readable medium described herein may further include operations, features, means, or instructions for identifying the secondary cell group minimum reserved transmission power for the transmissions from the UE to the secondary cell group during the transmission occasion, and determining the master cell group reserved transmission power, the master cell group reserved transmission power for allocation across component carriers of the master cell group during the transmission occasion.

In some examples of the method, apparatuses, and non-transitory computer-readable medium described herein, determining the master cell group reserved transmission power may include operations, features, means, or instructions for determining that a master cell group total scheduled transmission power may be less than or equal to a difference between a total available transmission power and the secondary cell group minimum reserved transmission power, and setting the master cell group reserved transmission power equal to the master cell group total scheduled transmission power based on the master cell group total scheduled transmission power being less than or equal to the difference.

In some examples of the method, apparatuses, and non-transitory computer-readable medium described herein, determining the master cell group reserved transmission power may include operations, features, means, or instructions for determining that a master cell group total scheduled transmission power may be greater than a difference between a total available transmission power and the secondary cell group minimum reserved transmission power, determining that no transmission may be scheduled to the secondary cell group during the transmission occasion, and setting the master cell group reserved transmission power equal to the master cell group total scheduled transmission power based on the master cell group total scheduled transmission power being greater than the difference and a lack of scheduled transmissions to the secondary cell group during the transmission occasion.

In some examples of the method, apparatuses, and non-transitory computer-readable medium described herein, determining the master cell group reserved transmission power may include operations, features, means, or instructions for determining that a master cell group total scheduled transmission power may be greater than a difference between a total available transmission power and the secondary cell group minimum reserved transmission power, determining that at least one transmission may be scheduled to the secondary cell group during the transmission occasion, determining that a secondary cell group total scheduled transmission power may be less than the secondary cell group minimum reserved transmission power, and setting the master cell group reserved transmission power equal to a difference between the total available transmission power and the secondary cell group total scheduled transmission power.

In some examples of the method, apparatuses, and non-transitory computer-readable medium described herein, determining the master cell group reserved transmission power may include operations, features, means, or instructions for determining that a master cell group total scheduled transmission power may be greater than a difference between a total available transmission power and the secondary cell group minimum reserved transmission power, determining that at least one transmission may be scheduled to the secondary cell group during the transmission occasion, determining that a secondary cell group total scheduled transmission power may be greater than or equal to the secondary cell group minimum reserved transmission power, and setting the master cell group reserved transmission power equal to a difference between the total available transmission power and the secondary cell group minimum reserved transmission power.

Some examples of the method, apparatuses, and non-transitory computer-readable medium described herein may further include operations, features, means, or instructions for identifying a master cell group minimum reserved transmission power for transmissions from the UE to the master cell group during the transmission occasion.

In some examples of the method, apparatuses, and non-transitory computer-readable medium described herein, allocating the master cell group reserved transmission power between scheduled transmissions to the master cell group during the transmission occasion may include operations, features, means, or instructions for allocating the master cell group reserved transmission power between scheduled transmissions to the master cell group based on a priority of the scheduled transmissions.

In some examples of the method, apparatuses, and non-transitory computer-readable medium described herein, allocating the secondary cell group reserved transmission power between scheduled transmissions to the secondary cell group during the transmission occasion may include operations, features, means, or instructions for allocating the secondary cell group reserved transmission power between scheduled transmissions to the secondary cell group based on a priority of the scheduled transmissions.

In some examples of the method, apparatuses, and non-transitory computer-readable medium described herein, the scheduled transmissions to the master cell group include ultra-reliable low-latency communications, and where the scheduled transmissions to the secondary cell group do not include ultra-reliable low-latency communications.

Some examples of the method, apparatuses, and non-transitory computer-readable medium described herein may further include operations, features, means, or instructions for identifying the secondary cell group minimum reserved transmission power for transmissions from the UE to the secondary cell group during the transmission occasion, determining a secondary cell group ultra-reliable low-latency communications total scheduled transmission power during the transmission occasion, and determining that a master cell group total scheduled transmission power may be less than or equal to a difference between a total available transmission power and the secondary cell group minimum reserved transmission power.

In some examples of the method, apparatuses, and non-transitory computer-readable medium described herein, determining the secondary cell group reserved transmission power may include operations, features, means, or instructions for scaling down a power of non-ultra-reliable low-latency communications with the secondary cell group during the transmission occasion, determining that a sum of the scaled down power of the non-ultra-reliable low-latency communications with the secondary cell group and the secondary cell group ultra-reliable low-latency communications may be less than or equal to the secondary cell group minimum reserved transmission power, and setting the secondary cell group reserved transmission power to be equal to the secondary cell group minimum reserved transmission power.

In some examples of the method, apparatuses, and non-transitory computer-readable medium described herein, determining the secondary cell group reserved transmission power may include operations, features, means, or instructions for scaling down a power of non-ultra-reliable low-latency communications with the secondary cell group during the transmission occasion, determining that a sum of the scaled down power of non-ultra-reliable low-latency communications with the secondary cell group and the secondary cell group ultra-reliable low-latency communications may be greater than the secondary cell group minimum reserved transmission power, identifying that the scheduled transmissions to the master cell group do not include ultra-reliable low-latency communications, scaling down the master cell group reserved transmission power based on a lack of ultra-reliable low-latency communications being scheduled during the transmission occasion, and setting the secondary cell group reserved transmission power to be equal to at least the secondary cell group ultra-reliable low-latency communications total scheduled transmission power.

Some examples of the method, apparatuses, and non-transitory computer-readable medium described herein may further include operations, features, means, or instructions for scaling down a power of non-ultra-reliable low-latency communications with the secondary cell group during the transmission occasion, determining that a sum of the scaled down power of non-ultra-reliable low-latency communications with the secondary cell group and the secondary cell group ultra-reliable low-latency communications may be greater than the secondary cell group minimum reserved transmission power, identifying that the scheduled transmissions to the master cell group include ultra-reliable low-latency communications, and scaling down selected transmission powers in order so that ultra-reliable low-latency communications with the master cell group may be prioritized.

In some examples of the method, apparatuses, and non-transitory computer-readable medium described herein, the order for scaling down the selected transmission powers may include operations, features, means, or instructions for scaling down the secondary cell group reserved transmission power to be equal to the secondary cell group minimum reserved transmission power, followed by scaling down non-ultra-reliable low-latency communications with the master cell group, and followed by scaling down ultra-reliable low-latency communications with the master cell group.

In some examples of the method, apparatuses, and non-transitory computer-readable medium described herein, the order for scaling down the selected transmission powers may include operations, features, means, or instructions for scaling down non-ultra-reliable low-latency communications with the master cell group, followed by scaling down ultra-reliable low-latency communications with the secondary cell group, and followed by scaling down ultra-reliable low-latency communications with the master cell group.

Some examples of the method, apparatuses, and non-transitory computer-readable medium described herein may further include operations, features, means, or instructions for identifying the secondary cell group minimum reserved transmission power for transmissions from the UE to the secondary cell group during the transmission occasion, determining a secondary cell group ultra-reliable low-latency communications total scheduled transmission power during the transmission occasion, determining that a master cell group total scheduled transmission power may be greater than a difference between a total available transmission power and the secondary cell group minimum reserved transmission power, and scaling down communications with the master cell group so that the master cell group reserved transmission power may be equal to the difference between the total available transmission power and the secondary cell group minimum reserved transmission power.

Some examples of the method, apparatuses, and non-transitory computer-readable medium described herein may further include operations, features, means, or instructions for identifying a master cell group minimum reserved transmission power for non-ultra-reliable low-latency communications for non-ultra-reliable low-latency transmissions from the UE to the master cell group during the transmission occasion, identifying a master cell group minimum reserved transmission power for ultra-reliable low-latency communications for ultra-reliable low-latency transmissions from the UE to the master cell group during the transmission occasion, identifying the secondary cell group minimum reserved transmission power for non-ultra-reliable low-latency communications for non-ultra-reliable low-latency transmissions from the UE to the secondary cell group during the transmission occasion, and identifying a secondary cell group minimum reserved transmission power for ultra-reliable low-latency communications for ultra-reliable low-latency transmissions from the UE to the secondary cell group during the transmission occasion.

In some examples of the method, apparatuses, and non-transitory computer-readable medium described herein, the master cell group minimum reserved transmission power for non-ultra-reliable low-latency communications may be independent from the master cell group minimum reserved transmission power for ultra-reliable low-latency communications, and where the secondary cell group minimum reserved transmission power for non-ultra-reliable low-latency communications may be independent from the secondary cell group minimum reserved transmission power for ultra-reliable low-latency communications.

Some examples of the method, apparatuses, and non-transitory computer-readable medium described herein may further include operations, features, means, or instructions for identifying that the UE may be power-limited.

Some examples of the method, apparatuses, and non-transitory computer-readable medium described herein may further include operations, features, means, or instructions for identifying that communications with the master cell group may have a higher priority than communications with the secondary cell group.

In some examples of the method, apparatuses, and non-transitory computer-readable medium described herein, determining the secondary cell group reserved transmission power may include operations, features, means, or instructions for scaling down the secondary cell group reserved transmission power based on the communications with the master cell group having the higher priority than the communications with the secondary cell group.

DETAILED DESCRIPTION

In some wireless communications systems, a user equipment (UE) may be configured to operate in a dual connectivity mode where the UE may communicate with two or more base stations. In such systems, the UE may be scheduled to simultaneously transmit uplink signals (e.g., data, control, or reference signals) to multiple base stations each associated with a cell group. For instance, the UE may be scheduled to transmit on one or more cells in a cell group to one base station, and the UE may be scheduled to transmit on one or more cells in another cell group to another base station. In some cases, however, a UE operating in a dual connectivity mode may be power limited (i.e., the UE may only have a limited amount of power for transmitting uplink signals), and it may be challenging for the UE to determine how to allocate power for simultaneous uplink transmissions (e.g., conflicting uplink transmissions) to multiple base stations.

As described herein, a UE may support efficient techniques for performing dynamic power control in a dual connectivity mode (for example, in a New Radio-New Radio dual connectivity mode). In particular, the UE may determine the reserved power (or maximum available power) for uplink transmissions on one or more cells in one cell group to a base station based on the total power available to the UE and the minimum reserved power for conflicting uplink transmissions on one or more cells in another cell group. Once the UE determines the reserved power for uplink transmissions on one or more cells in a cell group, the UE may allocate the reserved power to each uplink transmission on the one or more cells in the cell group (e.g., based on a priority of each of the uplink transmissions, such as channel type priorities). Ultra-reliable low-latency communication uplink transmissions are prioritized.

Aspects of the disclosure introduced above are described herein in the context of a wireless communications system. Examples of processes and signaling exchanges that support uplink power control prioritization in dual connectivity are then described. Aspects of the disclosure are further illustrated by and described with reference to apparatus diagrams, system diagrams, and flowcharts that relate to uplink power control prioritization in dual connectivity.

Figure 1:
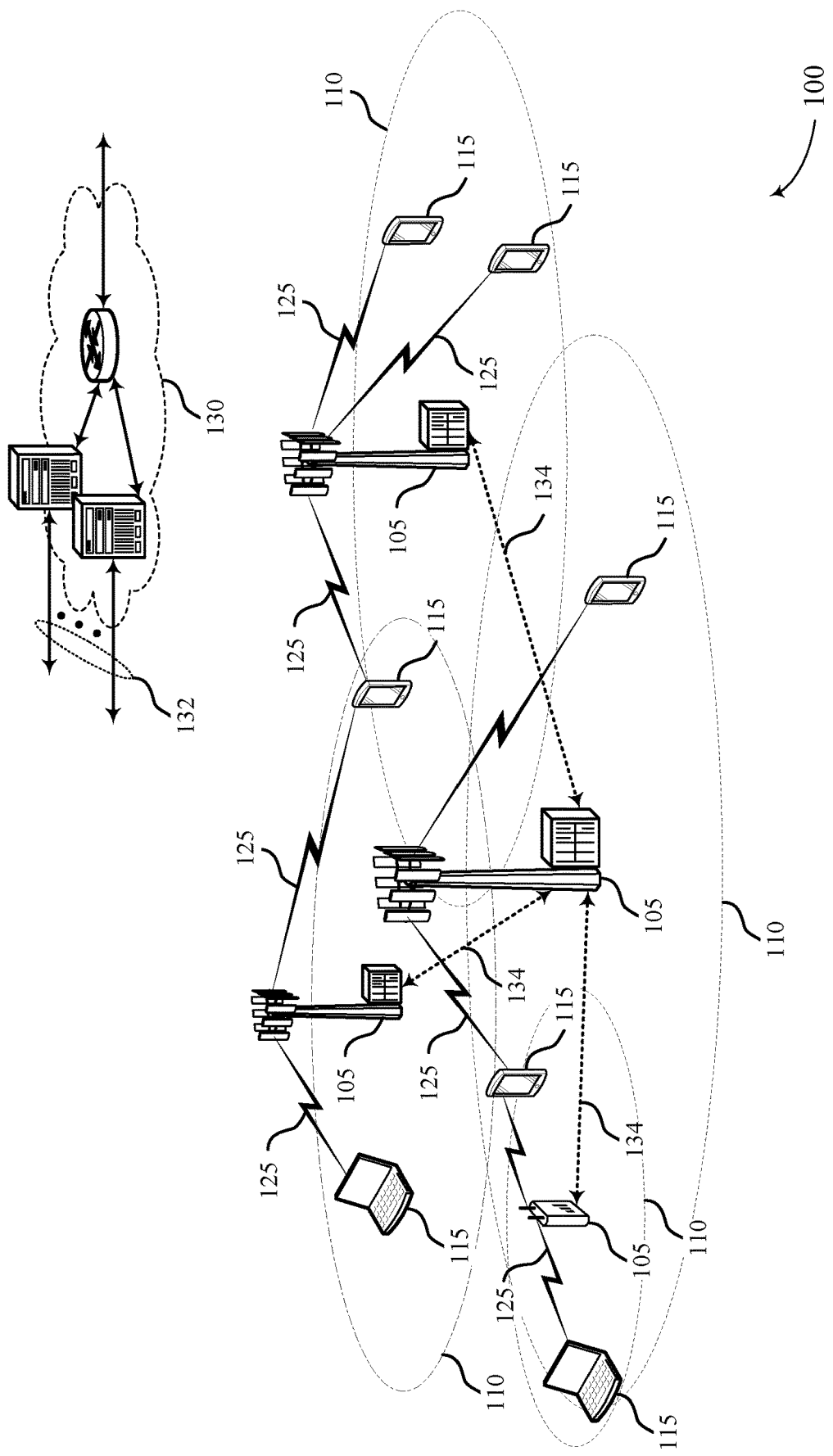
FIG. 1 illustrates an example of a wireless communications system that supports uplink power control prioritization in dual connectivity in accordance with aspects of the present disclosure.

FIG. 1 illustrates an example of a wireless communications system 100 that supports uplink power control prioritization in dual connectivity in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink shared channel (PUSCH) or a physical uplink control channel (PUCCH)), or downlink transmissions from a base station 105 to a UE 115 (e.g., in a physical downlink data channel (PDSCH) and a physical downlink control channel (PDCCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal received by the UE 115 with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at one or more antenna elements of an antenna array, or by processing received signals according to different receive beamforming weight sets applied to signals received at one or more antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" may to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces). Wireless communications system 100 may support communication with a UE 115 on multiple cells or carriers (e.g., a primary cell (PCell), one or more secondary cells (SCells), or one or more primary secondary cells (PSCells)), a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, a UE 115 configured to communicate using carrier aggregation may be scheduled to simultaneously transmit uplink signals to a base station 105 on multiple carriers. That is, the UE 115 may be scheduled for colliding uplink transmissions. In such cases, if the UE 115 is power limited (i.e., the UE 115 may only have a limited amount of power for the uplink transmissions), the UE 115 may be configured to scale the power for the uplink transmissions to the base station 105 on the multiple carriers based on prioritizing each of the uplink transmissions. That is, the UE 115 may scale the power for the uplink transmissions based on prioritization rules. In some aspects, the prioritization rules may indicate the priority order of different types of uplink transmissions. For instance, a physical random-access channel (PRACH) transmission on a PCell may be associated with a highest priority, followed by a PUCCH transmission, scheduling request transmission, or PUSCH transmission with HARQ information, followed by a PUCCH or PUSCH transmission with channel state information (CSI), followed by a sounding reference signal (SRS) transmission (e.g., with aperiodic SRS having a higher priority than semi-persistent and/or periodic SRS) or a PRACH transmission on a serving cell other than the PCell.

Thus, if a UE 115 with limited power is scheduled for colliding uplink transmissions, the UE 115 may determine the transmit power for each uplink transmission using the prioritization rules described above. For instance, if a first data transmission (e.g., PUSCH1 transmission) from the UE 115 is ongoing, and a second, higher priority data transmission (e.g., PUSCH2) from the UE 115 that collides with the first data transmission is scheduled later, UE 115 may scale down the transmit power of the first data transmission on the symbols of the first data transmission that overlap with the second data transmission. In this example, there may be phase discontinuity in the first data transmission, and, in some cases, the first data transmission may not be decodable. In such cases, though, since the base station 105 (i.e., the scheduler) may schedule the second, higher priority data transmission on the symbols overlapping with the first data transmission, the base station 105 may be able to identify the impact on the first data transmission. That is, the base station 105 may be able to determine that the first data transmission will be transmitted with a low transmit power and may potentially be undecodable, and the base station 105 may plan or operate accordingly.

In some cases, however, a power limited UE 115 may be configured to operate in a dual connectivity mode, and, if the UE 115 is scheduled for simultaneous uplink transmissions to different base stations 105 (e.g., each associated with a different cell group, such as a master cell group (MCG) or a secondary cell group (SCG)), a receiving base station 105 may not be able to detect that an uplink transmission intended for the base station 105 is impacted by another uplink transmission intended for a different base station 105 (e.g., detect if the uplink transmission is transmitted with a reduced power). As such, in wireless communications system 100, when a UE 115 is configured to operate in a dual connectivity mode, where the UE 115 may simultaneously transmit uplink signals to different base stations 105 associated with different cell groups, a minimum reserved power per cell group may be defined (e.g., to facilitate dynamic power control in a dual connectivity deployment in wireless communications system 100). In such cases, as long as the power of uplink transmissions in a first cell group remains within the minimum reserved power of the first cell group (e.g., the reserved power of one cell group is respected by the other cell group), the uplink transmissions in the first cell group may not impact the uplink transmissions in a second cell group (e.g., may not impact the phase continuity of uplink transmission in the second cell group).

Thus, as described herein, a wireless communications system may define reserved powers for transmitting uplink signals to a base station associated with an MCG and one or more base stations associated with SCGs. A UE 115 may therefore scale the power for uplink transmissions to multiple base stations based on prioritizing the uplink transmissions (e.g., such that the transmit power of uplink transmissions to a base station 105 associated with a cell group is within the reserved power for that cell group). In some examples, the UE 115 may prioritize the uplink transmissions based on the types of the uplink transmissions (e.g., in accordance with the prioritization rules discussed above) and whether the uplink transmission are to a base station 105 associated with an MCG or a base station associated with an SCG. For instance, a PRACH transmission on a PCell to a base station associated with an MCG may be associated with a highest priority, followed by a PRACH transmission on a PCell to a base station 105 associated with an SCG, followed by a PUCCH or PUSCH transmission with HARQ information to a base station 105 associated with an MCG, followed by a PUCCH or PUSCH transmission with HARQ information to a base station 105 associated with an SCG, and so on (e.g., resulting in a ping-pong effect in the prioritization of uplink transmissions). In the event that two uplink transmissions have a same priority order (e.g., for operation with carrier aggregation), the UE 115 may prioritize power allocation for transmissions on the PCell of the MCG or the SCG over transmissions on an SCell and may prioritize power allocation for transmissions on the PCell over transmissions on the PSCell.

Thus, in accordance with the above examples, the power for the uplink transmissions may be scaled based on the reserved powers for different cell groups and based on prioritizing uplink transmissions to base stations 105 associated with different cell groups based on the types of the uplink transmissions and whether the uplink transmissions are to base stations 105 associated with MCGs or SCGs. In such examples, however, the process of dynamic power control at a UE 115 may be complex. As described herein, a UE 115 in wireless communications system 100 may support efficient techniques for performing dynamic power control with minimal complexity. In particular, the UE 115 may determine a reserved power (or maximum available power) for uplink transmissions on one or more cells in one cell group to a base station 105 based on the total power available to the UE 115 and the minimum reserved power for conflicting uplink transmissions on one or more cells in another cell group.

Figure 2:
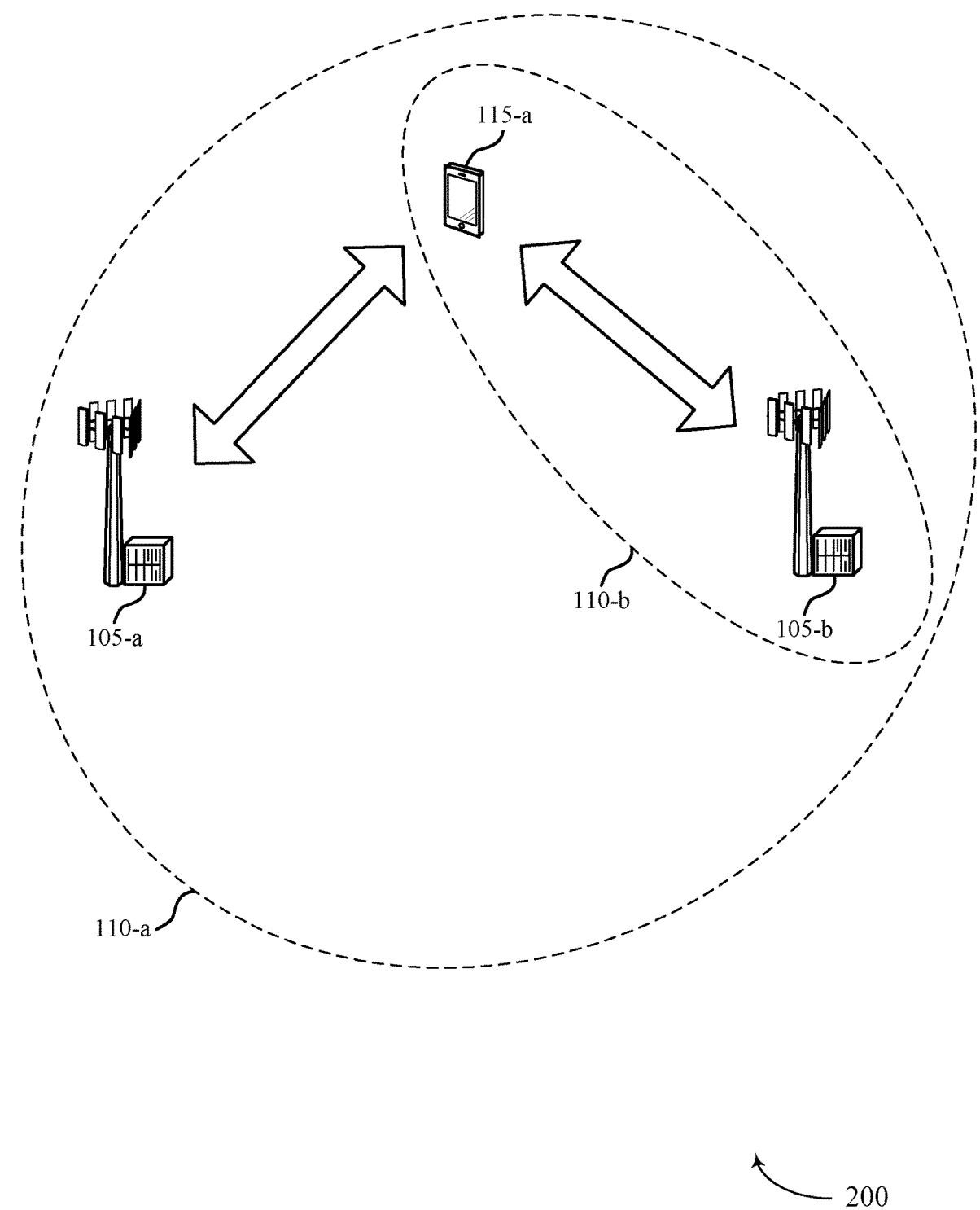
FIG. 2 illustrates an example of a wireless communications system that supports uplink power control prioritization in dual connectivity in accordance with aspects of the present disclosure.

FIG. 2 illustrates an example of a wireless communications system 200 that supports uplink power control prioritization in dual connectivity in accordance with aspects of the present disclosure. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a may provide communication coverage for a respective coverage area 110-a, which may be an example of a coverage area 110 described with reference to FIG. 1. Additionally, base station 105-a may provide communication coverage for a respective coverage area 110-b, which may be an example of a coverage area 110 described with reference to FIG. 1. Wireless communications system 200 may implement aspects of wireless communications system 100. For example, UE 115-a in wireless communications system 200 may support efficient techniques for performing dynamic power control with minimal complexity.

In the example of FIG. 2, UE 115-a may be configured to operate in a dual connectivity mode, and UE 115-a may communicate with base station 105-a on one or more cells in an MCG and with base station 105-b on one or more cells in an SCG. UE 115-a may be scheduled for one or more uplink transmissions to base station 105-a (e.g., on one or more cells of the MCG) and one or more uplink transmissions to base station 105-b (e.g., on one or more cells of the SCG). Thus, as described herein, UE 115-a may determine whether to scale the power of uplink transmissions to base station 105-a or base station 105-b, and, if UE 115-a determines to scale the uplink transmissions to one of base station 105-a and base station 105-b, UE 115-a may scale the uplink transmissions to determine a reserved power for uplink transmissions to the base station 105 (e.g., the power to use for uplink transmissions to the base station 105). Once UE 115-a determines the reserved power for the uplink transmissions to the base station 105 associated with one or more cells in a cell group, the UE may allocate the reserved power to each uplink transmission on the one or more cells in the cell group (e.g., based on a priority of each of the uplink transmissions).

Using the techniques described herein, the power scaling or allocation across multiple cell groups (e.g., an MCG and SCG) may not depend on the type or the content of uplink transmissions (e.g., or channels) on the cells of the cell groups. Instead, the power scaling or allocation (e.g., the sum power) may be determined based on the cell groups (e.g., whether the cell group is an MCG or SCG, where the MCG may be associated with a higher priority than the SCG). Then, further power scaling is performed within each group (e.g., not across the cell groups, such that there is no ping-pong effect). Further details related to determining when to scale the power of uplink transmissions to base stations in a cell group are described below with reference to FIGS. 3 and 4.

Figure 3:
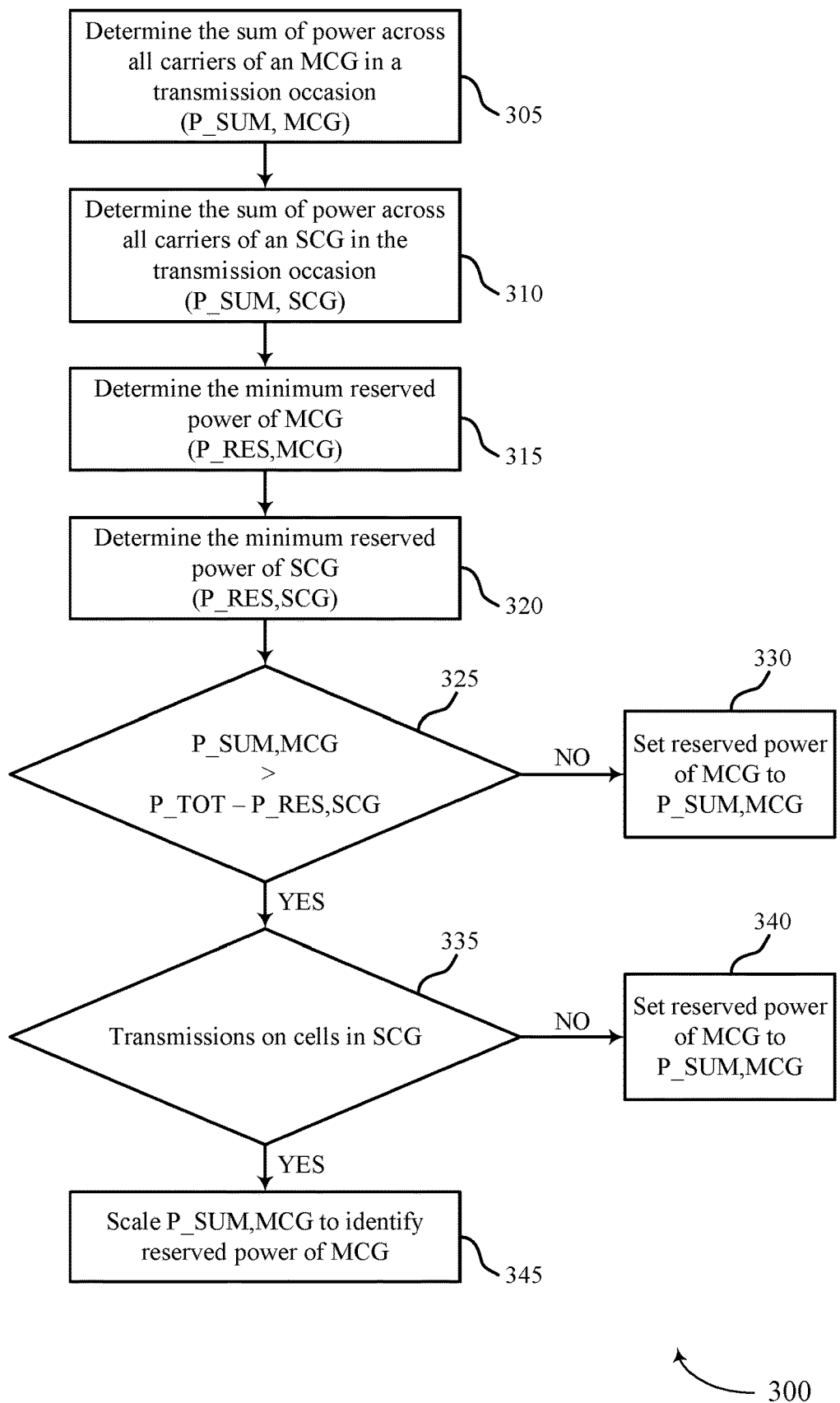
FIG. 3 illustrates an example of a flowchart in accordance with aspects of the present disclosure.

FIG. 3 illustrates an example of a flowchart 300 in accordance with aspects of the present disclosure. At 305, UE 115-a may determine the sum of power across all carriers of an MCG in a transmission occasion (P_SUM, MCG), and, at 310, UE 115-a may determine the sum of power across all carriers of an SCG in the transmission occasion (P_SUM,SCG). At 315, UE 115-a may determine the minimum reserved power for uplink transmissions on cells in the MCG (P_RES,MCG), and, at 320, UE 115-a may determine the minimum reserved power for uplink transmissions on cells in the SCG (P_RES,SCG). UE 115-a may then use the values determined above to determine whether and how to scale power for the uplink transmissions on cells in the MCG to base station 105-a and uplink transmissions on cells in the SCG to base station 105-b.

At 325, if UE 115-a determines that P_SUM,MCG is less than or equal to a difference between the total transmit power available for uplink transmissions (P_TOT) and P_RES,SCG, UE 115-a may set the reserved power for uplink transmissions to cells in the MCG to P_SUM,MCG (i.e., the UE 115-a may not have to scale P_SUM,MCG since there may be sufficient power available). Alternatively, if UE 115-a determines that P_SUM,MCG is greater than a difference between P_TOT and P_RES,SCG, UE 115-a may then determine if there are uplink transmissions scheduled on cells in the SCG in the transmission occasion. If UE 115-a determines that there are no conflicting uplink transmissions scheduled on cells in the SCG in the transmission occasion, UE 115-a may set the reserved power for uplink transmissions to cells in the MCG to P_SUM,MCG (i.e., the UE 115-a gets the requested power and may not have to scale P_SUM,MCG since there may be sufficient power available). Similarly, if UE 115-a determines that P_SUM, SCG is greater than P_RES,SCG and determines that there are no uplink transmissions scheduled on cells in the MCG, UE 115-a may set the reserved power for uplink transmissions to cells in the SCG to P_SUM,SCG (i.e., the UE 115-a gets the requested power and may not have to scale P_SUM, SCG since there may be sufficient power available).

However, if UE 115-a determines that there are conflicting uplink transmissions scheduled on cells in the SCG in the transmission occasion, UE 115-a may scale P_SUM, MCG down to the reserved power for MCG (i.e., UE 115-a may determine the reserved power for MCG based on scaling P_SUM,MCG). That is, since the priority of transmissions on cells in the MCG may be higher than the priority of transmissions on cells in the SCG, UE 115-a may allocate power originally reserved for uplink transmissions on cells in the SCG to uplink transmissions on cells in the MCG. In such cases, if P_SUM,MCG is greater than the difference between P_TOT and P_RES,SCG, and there are transmissions on cells in the SCG, the reserved power for uplink transmissions on cells in the MCG may be scaled to the maximum of the difference between P_TOT and P_SUM, SCG (i.e., P_TOT−P_SUM,SCG) and the difference between P_TOT and P_RES,SCG (i.e., P_TOT−P_SUM, SCG). That is, if P_SUM,SCG is less than P_RES,SCG, then the reserved power for uplink transmissions on cells in the MCG may be scaled to the difference between P_TOT and P_SUM,SCG (e.g., in this case, some of the unused power reserved for uplink transmissions on cells in the SCG may be used for uplink transmissions on cells in the MCG). Alternatively, if P_SUM,SCG is greater than or equal to P_RES,SCG, then the reserved power for uplink transmissions on cells in the MCG may be scaled to the difference between P_TOT and P_RES,SCG.

Once the reserved power for each cell group (i.e., the MCG and SCG) is determined (e.g., the maximum total power available for uplink transmissions on cells in each cell group after scaling), UE 115-*a* may allocate power to different uplink transmissions on cells in the cell group based on prioritizing each of the uplink transmissions (e.g., based on the prioritization rules outlined for carrier aggregation configurations described with reference to FIG. 1). Thus, if the priority of uplink transmissions on cells in an MCG is always higher than the priority of uplink transmissions on cells in an SCG, then a minimum power for uplink transmissions on cells in an MCG may not have to be defined (e.g., since UE 115-*a* may not have to scale the power of uplink transmissions based on a minimum power for uplink transmissions). The techniques described above may be used for scaling the power of mobile broadband (MBB) uplink transmissions on cells in an MCG and/or an SCG. In other examples, however, UE 115-*a* may be scheduled for ultra-reliable low-latency communications (URLLC) uplink transmissions on cells in an MCG and/or an SCG.

Thus, further techniques for scaling the power of uplink transmissions on cells in an MCG and/or an SCG when the uplink transmissions include MBB uplink transmissions and/or URLLC uplink transmissions are described herein. In one example, UE 115-*a* may use the techniques described with reference to FIG. 3 to determine the reserved power for uplink transmissions on an MCG and an SCG (e.g., where the determined reserved power or the defined minimum reserved power used to determine the reserved power may be sufficient for URLLC). In another example, if uplink transmissions on cells in an MCG include URLLC transmissions, and uplink transmissions on cells in an SCG do not include URLLC transmissions, UE 115-*a* may use the techniques described with reference to FIG. 3 to determine the reserved power for uplink transmissions on an MCG and an SCG (e.g., where the determined reserved power or the defined minimum reserved power used to determine the reserved power may be sufficient for URLLC). In yet another example, if uplink transmissions on cells in an SCG include URLLC transmissions, UE 115-*a* may use the techniques described with reference to FIG. 4 to determine the reserved power for uplink transmissions on an MCG and an SCG. In each of these examples, the UE 115-*a* may allocate the reserved power to different uplink transmissions on cells in an MCG based on prioritizing each of the uplink transmissions (as discussed above with reference to FIGS. 1 and 3), where URLLC uplink transmissions may be associated with higher priorities.

Figure 4:
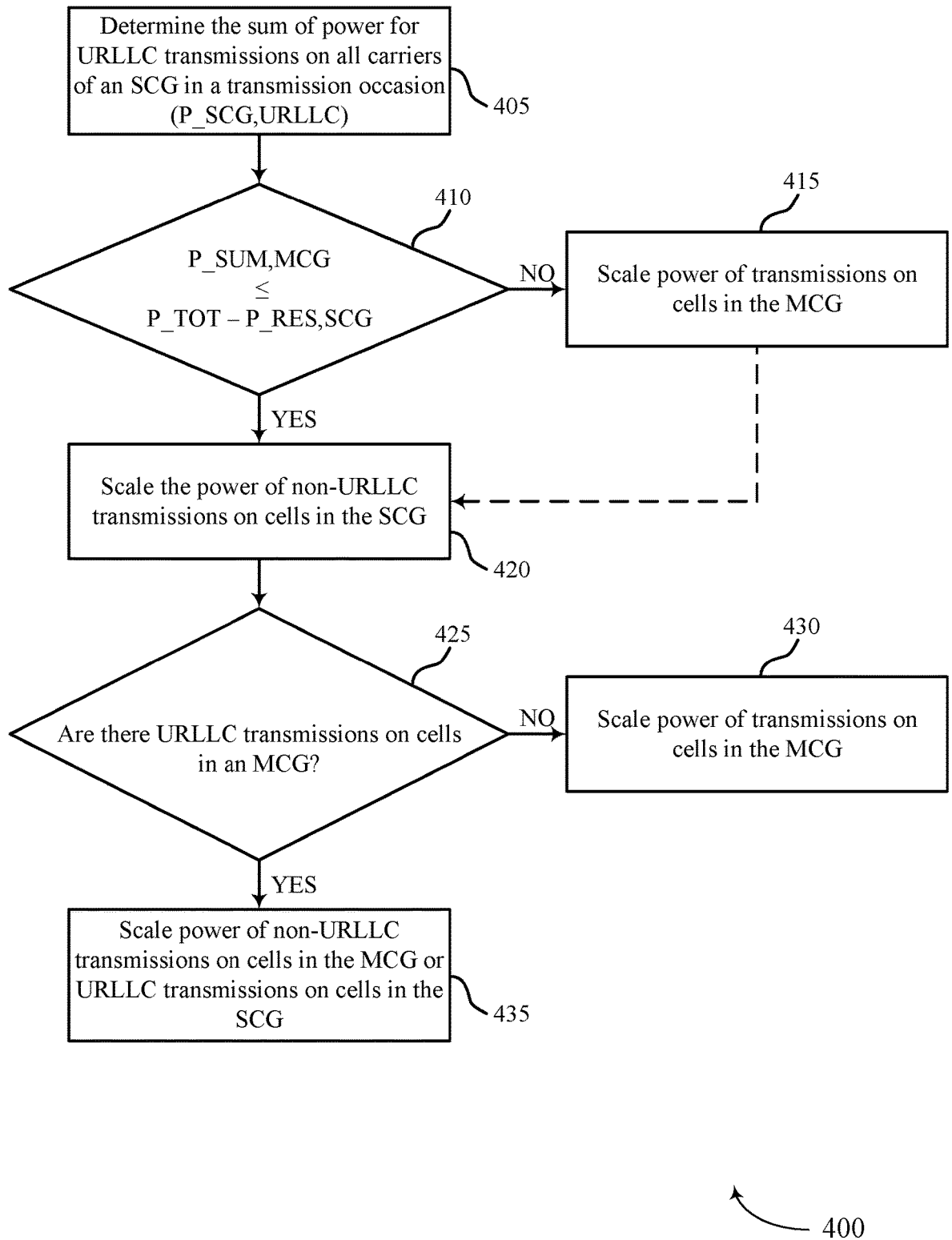
FIG. 4 illustrates an example of a flowchart in accordance with aspects of the present disclosure.

FIG. 4 illustrates an example of a flowchart 400 in accordance with aspects of the present disclosure. In some aspects, UE 115-*a* may perform the first four operations described with reference to flowchart 300 in FIG. 3 before proceeding to the operations described with reference to FIG. 4. At 405, UE 115-*a* may determine the sum of power for URLLC transmissions on all carriers of an SCG in a transmission occasion (P_SCG,URLLC). UE 115-*a* may then use the values determined above to determine whether and how to scale power for the uplink transmissions on cells in the MCG to base station 105-*a* and uplink transmissions on cells in the SCG to base station 105-*b*. At 410, if UE 115-*a* determines that P_SUM,MCG is greater than the difference between P_TOT and P_RES,SCG, UE 115-*a* may scale the P_SUM,MCG down to determine the reserved power for uplink transmissions on cells in the MCG (e.g., UE 115-*a* may determine the reserved power to be equal to the difference between P_TOT and P_RES,SCG). After scaling the P_SUM,MCG down to determine the reserved power for uplink transmissions on cells in the MCG, if UE 115-*a* is still power limited, UE 115-*a* may proceed to 420. At 420, UE 115-*a* may scale down the power of other non-URLLC transmissions (or channels) on cells in the SCG (i.e., if the UE 115-*a* is still power limited).

At 425, UE 115-*a* may then determine whether there are any URLLC uplink transmissions scheduled on cells in the MCG in the transmission occasion. If UE 115-*a* determines that there are no URLLC uplink transmissions scheduled on cells in the MCG in the transmission occasion, at 430, UE 115-*a* may scale down the power for uplink transmissions on cells in the MCG such that the reserved power for uplink transmissions on cells in the MCG is equal to or less than the difference between P_TOT and P_SCG,URLLC (i.e., UE 115-*a* may scale down P_SUM,MCG such that the new P_SUM,MCG (or the determined reserved power) is less than or equal to P_TOT−P_SCG, URLLC). Alternatively, at 435, UE 115-*a* may scale the power of non-URLLC transmissions on cells in the MCG and/or URLLC transmissions on cells in the SCG.

In one example, if the priority of non-URLLC transmissions on cells in the MCG is greater than the priority of URLLC transmissions on cells in the SCG, UE 115-*a* may first scale down the power for the URLLC transmissions on the cells in the SCG (e.g., with a maximum down scale up to the minimum reserved power for transmissions on cells in the SCG). Then, if the UE 115-*a* is still power limited, UE 115-*a* may scale down the power for non-URLLC transmissions on cells in the MCG. In another example, if the priority of URLLC transmissions on cells in the SCG is greater than the priority of non-URLLC transmissions on cells in the MCG, UE 115-*a* may first scale down the power for the non-URLLC transmissions on cells in the MCG. Then, if the UE 115-*a* is still power limited, UE 115-*a* may scale down the power for URLLC transmissions on cells in the SCG. In both examples, if, after scaling down the power of the non-URLLC transmissions on cells in the MCG and the URLLC transmissions on cells in the SCG, UE 115-*a* is still power limited, UE 115-*a* may further scale down the sum power for URLLC transmissions on cells in the MCG or URLLC transmissions on cells in the SCG (e.g., depending on whether URLLC transmissions on cells in the MCG has a higher priority than URLLC transmissions on cells in the SCG, or vice versa).

In some aspects, wireless communications system 200 may indicate power sharing configurations specifically for URLLC transmissions or URLLC channels for multiple cells groups (e.g., MCG and SCG) (e.g., may configure a reserved power or minimum reserved power for SCG URLLC and MCG URLLC). The minimum reserved power configuration for URLLC may be independent of the reserved power for MBB. In such aspects, UE 115-*a* may determine the reserved power (e.g., maximum available transmit power) for uplink transmissions on cells in a cell group based on the power sharing configurations. In particular, UE 115-*a* may determine the reserved power for uplink transmissions on cells in a cell group based on comparing the P_SUM,MCG value for URLLC uplink transmissions to the difference between the P_TOT and the P_RES,SCG value for URLLC uplink transmissions (e.g., UE 115-*a* may scale the power for URLLC uplink transmissions in accordance using the techniques described with reference to FIG. 3 for MBB uplink transmissions).

Then, if UE 115-*a* determines that there is remaining power unused for URLLC uplink transmissions, UE 115-*a* may distribute the remaining power for MBB uplink transmissions (e.g., on cells in the MCG or cells in the SCG depending on the prioritization of uplink transmissions on cells in the MCG and uplink transmission on cells in the SCG). Alternatively, if UE 115-*a* determines that there is remaining power unused for URLLC uplink transmissions, UE 115-*a* may determine the reserved power for MBB uplink transmissions on cells in the MCG and the SCG using the techniques described with reference to FIG. 3 (e.g., where the total available power (or the updated P_TOT) is the difference between P_TOT (the original P_TOT) and the sum of the power used for URLLC channels on cells in the MCG and the SCG).

Figure 5:
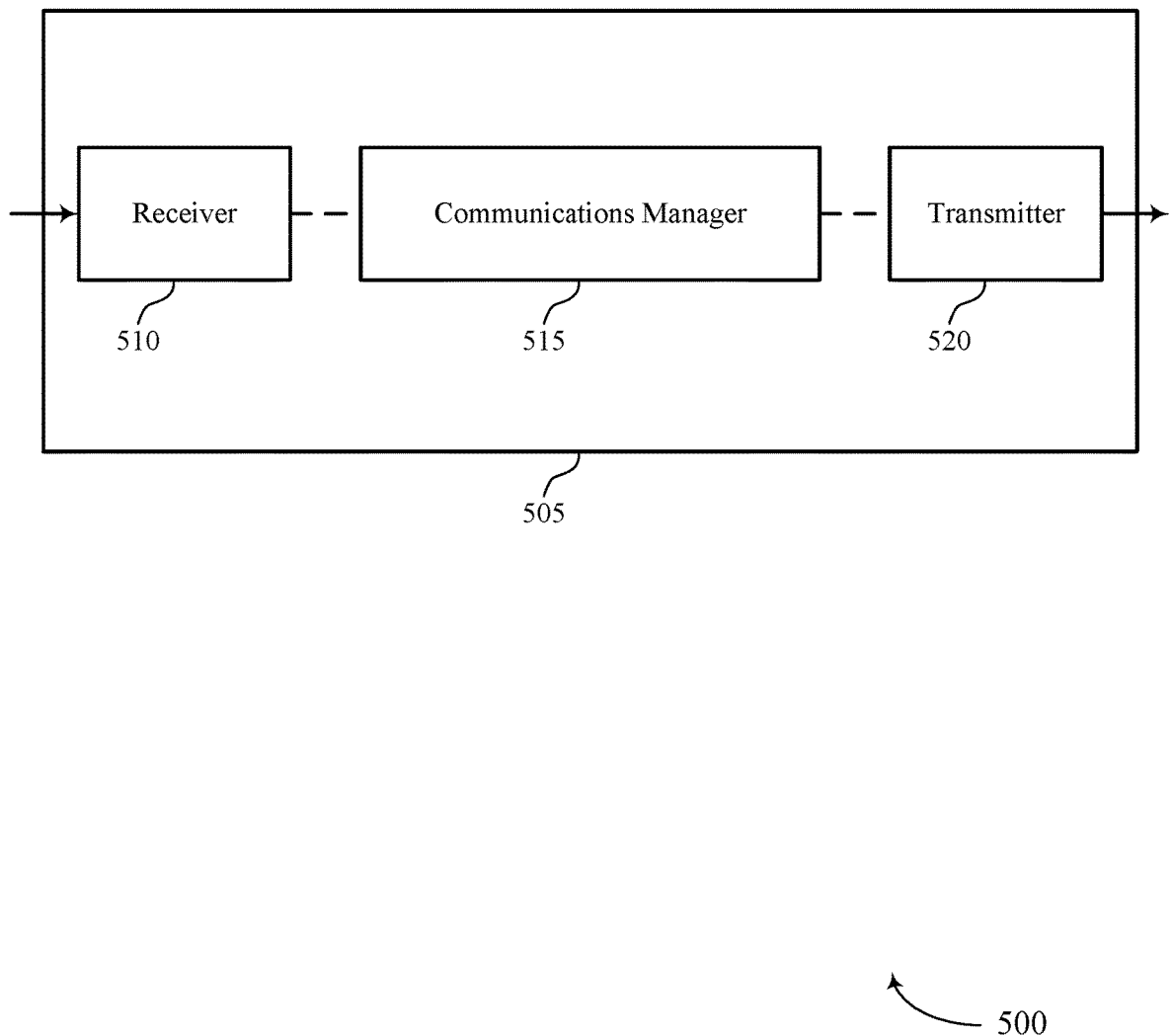
FIGS. 5 and 6 show block diagrams of devices that support uplink power control prioritization in dual connectivity in accordance with aspects of the present disclosure.

FIG. 5 shows a block diagram 500 of a device 505 that supports uplink power control prioritization in dual connectivity in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink power control prioritization in dual connectivity, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify that the UE is operating in dual connectivity with a master cell group and a secondary cell group, determine a secondary cell group reserved transmission power for allocation across component carriers of the secondary cell group during a transmission occasion based at least in part on a secondary cell group minimum reserved transmission power for transmissions from the UE to the secondary cell group during the transmission occasion, allocate a master cell group reserved transmission power between scheduled transmissions to the master cell group during the transmission occasion based at least in part on the secondary cell group reserved transmission power and a channel type priority, allocate the secondary cell group reserved transmission power between scheduled transmissions to the secondary cell group during the transmission occasion, and communicate with the master cell group and with the secondary cell group in accordance with the power allocations. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
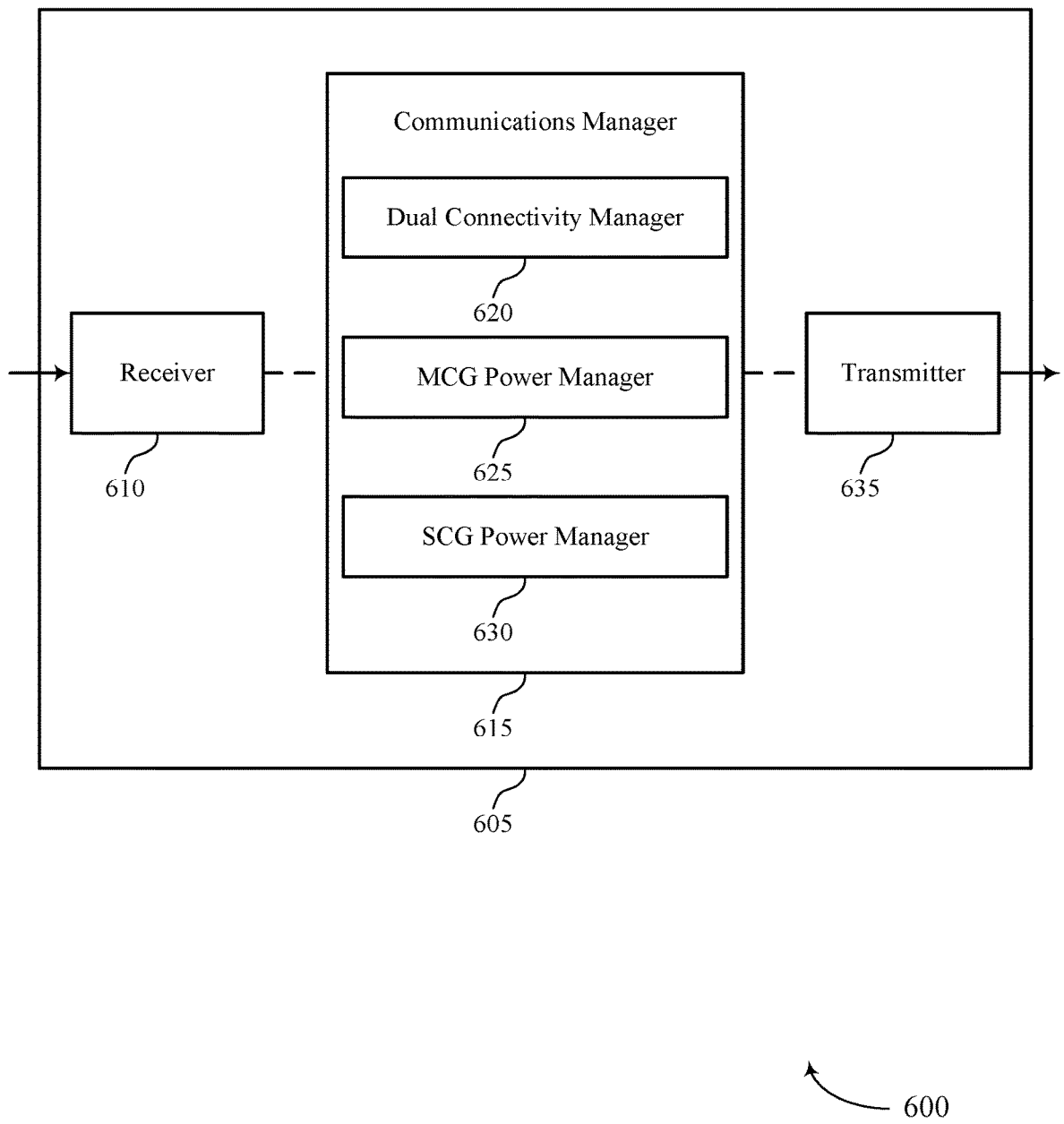

FIG. 6 shows a block diagram 600 of a device 605 that supports uplink power control prioritization in dual connectivity in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink power control prioritization in dual connectivity, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a dual connectivity manager 620, a MCG power manager 625, and a SCG power manager 630. The communications manager 615 may be an example of aspects of the communications manager 810 described herein.

The dual connectivity manager 620 may identify that the UE is operating in dual connectivity with a master cell group and a secondary cell group. The MCG power manager 625 may determine a master cell group reserved transmission power for allocation across component carriers of the master cell group during a transmission occasion and allocate the master cell group reserved transmission power between scheduled transmissions to the master cell group during the transmission occasion. In some examples, the MCG power manager 625 may allocate the master cell group reserved transmission power between scheduled transmissions to the master cell group during the transmission occasion based on the secondary cell group reserved transmission power and a channel type priority. The SCG power manager 630 may determine a secondary cell group reserved transmission power for allocation across component carriers of the secondary cell group during the transmission occasion. In some examples, determining the secondary cell group reserved transmission power may be based on a secondary cell group minimum reserved transmission power for transmissions from the UE to the secondary cell group during the transmission occasion. The SCG power manager 630 may allocate the secondary cell group reserved transmission power between scheduled transmissions to the secondary cell group during the transmission occasion. The dual connectivity manager 620 may communicate with the master cell group and with the secondary cell group in accordance with the power allocations.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
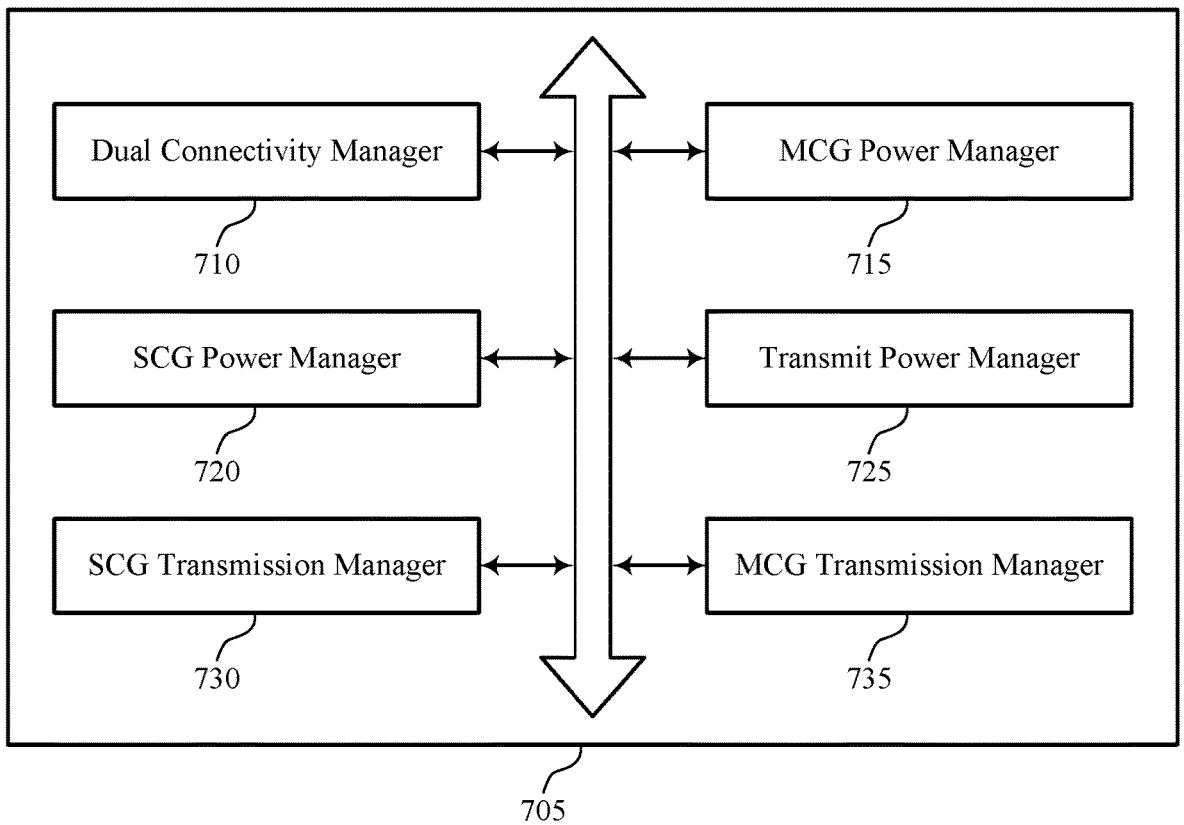
FIG. 7 shows a block diagram of a communications manager that supports uplink power control prioritization in dual connectivity in accordance with aspects of the present disclosure.

FIG. 7 shows a block diagram 700 of a communications manager 705 that supports uplink power control prioritization in dual connectivity in accordance with aspects of the present disclosure. The communications manager 705 may be an example of aspects of a communications manager 515, a communications manager 615, or a communications manager 810 described herein. The communications manager 705 may include a dual connectivity manager 710, a MCG power manager 715, a SCG power manager 720, a transmit power manager 725, a SCG transmission manager 730, and a MCG transmission manager 735. Each of these modules may communicate, directly or indirectly, with one another (e.g., via one or more buses).

The dual connectivity manager 710 may identify that the UE is operating in dual connectivity with a master cell group and a secondary cell group. In some examples, the dual connectivity manager 710 may communicate with the master cell group and with the secondary cell group in accordance with the power allocations. In some examples, the dual connectivity manager 710 may identify that communications with the master cell group have a higher priority than communications with the secondary cell group. The MCG power manager 715 may determine a master cell group reserved transmission power for allocation across component carriers of the master cell group during a transmission occasion. In some examples, the MCG power manager 715 may allocate the master cell group reserved transmission power between scheduled transmissions to the master cell group during the transmission occasion. In some examples, allocating the master cell group reserved transmission power may be based on a secondary cell group reserved transmission power and a channel type priority. In some examples, the channel type priority may include at least one of a non-ultra-reliable low-latency communication with the master cell group, an ultra-reliable low-latency communication with the secondary cell group, or an ultra-reliable low-latency communication with the master cell group.

In some examples, the MCG power manager 715 may set the master cell group reserved transmission power equal to the master cell group total scheduled transmission power based on the master cell group total scheduled transmission power being less than or equal to the difference. In some examples, the MCG power manager 715 may set the master cell group reserved transmission power equal to the master cell group total scheduled transmission power based on the master cell group total scheduled transmission power being greater than the difference and a lack of scheduled transmissions to the secondary cell group during the transmission occasion.

In some examples, the MCG power manager 715 may set the master cell group reserved transmission power equal to a difference between the total available transmission power and the secondary cell group total scheduled transmission power. In some examples, the MCG power manager 715 may set the master cell group reserved transmission power equal to a difference between the total available transmission power and the secondary cell group minimum reserved transmission power. In some examples, the MCG power manager 715 may identify a master cell group minimum reserved transmission power for transmissions from the UE to the master cell group during the transmission occasion.

In some examples, the MCG power manager 715 may allocate the master cell group reserved transmission power between scheduled transmissions to the master cell group based on a priority of the scheduled transmissions. In some examples, the MCG power manager 715 may scale down the master cell group reserved transmission power based on a lack of ultra-reliable low-latency communications being scheduled during the transmission occasion. In some examples, the MCG power manager 715 may identify a master cell group minimum reserved transmission power for non-ultra-reliable low-latency communications for non-ultra-reliable low-latency transmissions from the UE to the master cell group during the transmission occasion.

In some examples, the MCG power manager 715 may identify a master cell group minimum reserved transmission power for ultra-reliable low-latency communications for ultra-reliable low-latency transmissions from the UE to the master cell group during the transmission occasion. In some cases, the scheduled transmissions to the master cell group include ultra-reliable low-latency communications, and where the scheduled transmissions to the secondary cell group do not include ultra-reliable low-latency communications.

The SCG power manager 720 may determine a secondary cell group reserved transmission power for allocation across component carriers of the secondary cell group during the transmission occasion. In some examples, determining the secondary cell group reserved transmission power may be based on a secondary cell group minimum reserved transmission power for transmissions from the UE to the secondary cell group during the transmission occasion. In some examples, the SCG power manager 720 may allocate the secondary cell group reserved transmission power between scheduled transmissions to the secondary cell group during the transmission occasion. In some examples, the SCG power manager 720 may identify a secondary cell group minimum reserved transmission power for transmissions from the UE to the secondary cell group during the transmission occasion. In some examples, the SCG power manager 720 may determine that a secondary cell group total scheduled transmission power is less than the secondary cell group minimum reserved transmission power.

In some examples, the SCG power manager 720 may determine that a secondary cell group total scheduled transmission power is greater than or equal to the secondary cell group minimum reserved transmission power. In some examples, the SCG power manager 720 may allocate the secondary cell group reserved transmission power between scheduled transmissions to the secondary cell group based on a priority of the scheduled transmissions. In some examples, the SCG power manager 720 may identify a secondary cell group minimum reserved transmission power for transmissions from the UE to the secondary cell group during the transmission occasion. In some examples, the SCG power manager 720 may determine a secondary cell group ultra-reliable low-latency communications total scheduled transmission power during the transmission occasion.

In some examples, the SCG power manager 720 may scale down a power of non-ultra-reliable low-latency communications with the secondary cell group during the transmission occasion. In some examples, the SCG power manager 720 may determine that a sum of the scaled down power of non-ultra-reliable low-latency communications with the secondary cell group and the secondary cell group ultra-reliable low-latency communications is less than or equal to the secondary cell group minimum reserved transmission power. In some examples, the SCG power manager 720 may set the secondary cell group reserved transmission power to be equal to the secondary cell group minimum reserved transmission power. In some examples, the SCG power manager 720 may determine that a sum of the scaled down power of non-ultra-reliable low-latency communications with the secondary cell group and the secondary cell group ultra-reliable low-latency communications is greater than the secondary cell group minimum reserved transmission power.

In some examples, the SCG power manager 720 may set the secondary cell group reserved transmission power to be equal to at least the secondary cell group ultra-reliable low-latency communications total scheduled transmission power. In some examples, the SCG power manager 720 may determine a secondary cell group ultra-reliable low-latency communications total scheduled transmission power during the transmission occasion. In some examples, the SCG power manager 720 may identify a secondary cell group minimum reserved transmission power for non-ultra-reliable low-latency communications for non-ultra-reliable low-latency transmissions from the UE to the secondary cell group during the transmission occasion. In some examples, the SCG power manager 720 may identify a secondary cell group minimum reserved transmission power for ultra-reliable low-latency communications for ultra-reliable low-latency transmissions from the UE to the secondary cell group during the transmission occasion.

In some examples, the SCG power manager 720 may scale down the secondary cell group reserved transmission power based on the communications with the master cell group having higher priority than the communication with the secondary cell group. The transmit power manager 725 may determine that a master cell group total scheduled transmission power is less than or equal to a difference between a total available transmission power and the secondary cell group minimum reserved transmission power. In some examples, the transmit power manager 725 may determine that a master cell group total scheduled transmission power is greater than a difference between a total available transmission power and the secondary cell group minimum reserved transmission power. In some examples, the transmit power manager 725 may determine that a master cell group total scheduled transmission power is less than or equal to a difference between a total available transmission power and the secondary cell group minimum reserved transmission power.

In some examples, the transmit power manager 725 may scale down selected transmission powers in order so that ultra-reliable low-latency communications with the master cell group are prioritized. In some examples, the transmit power manager 725 may scale down the secondary cell group reserved transmission power to be equal to the secondary cell group minimum reserved transmission power, followed by scaling down non-ultra-reliable low-latency communications with the master cell group, and followed by scaling down ultra-reliable low-latency communications with the master cell group. In some examples, the transmit power manager 725 may scale down non-ultra-reliable low-latency communications with the master cell group, followed by scaling down ultra-reliable low-latency communications with the secondary cell group, and followed by scaling down ultra-reliable low-latency communications with the master cell group.

In some examples, the transmit power manager 725 may determine that a master cell group total scheduled transmission power is greater than a difference between a total available transmission power and the secondary cell group minimum reserved transmission power. In some examples, the transmit power manager 725 may scale down the communications with the master cell group so that the master cell group reserved transmission power is equal to the difference between the total available transmission power and the secondary group minimum reserved transmission power. In some examples, the transmit power manager 725 may identify that the UE is power-limited.

In some cases, the master cell group minimum reserved transmission power for non-ultra-reliable low-latency communications is independent from the master cell group minimum reserved transmission power for ultra-reliable low-latency communications, and where the secondary cell group minimum reserved transmission power for non-ultra-reliable low-latency communications is independent from the secondary cell group minimum reserved transmission power for ultra-reliable low-latency communications. The SCG transmission manager 730 may determine that no transmission is scheduled to the secondary cell group during the transmission occasion. In some examples, the SCG transmission manager 730 may determine that at least one transmission is scheduled to the secondary cell group during the transmission occasion. The MCG transmission manager 735 may identify that the scheduled transmissions to the master cell group do not include ultra-reliable low-latency communications. In some examples, the MCG transmission manager 735 may identify that the scheduled transmissions to the master cell group include ultra-reliable low-latency communications.

Figure 8:
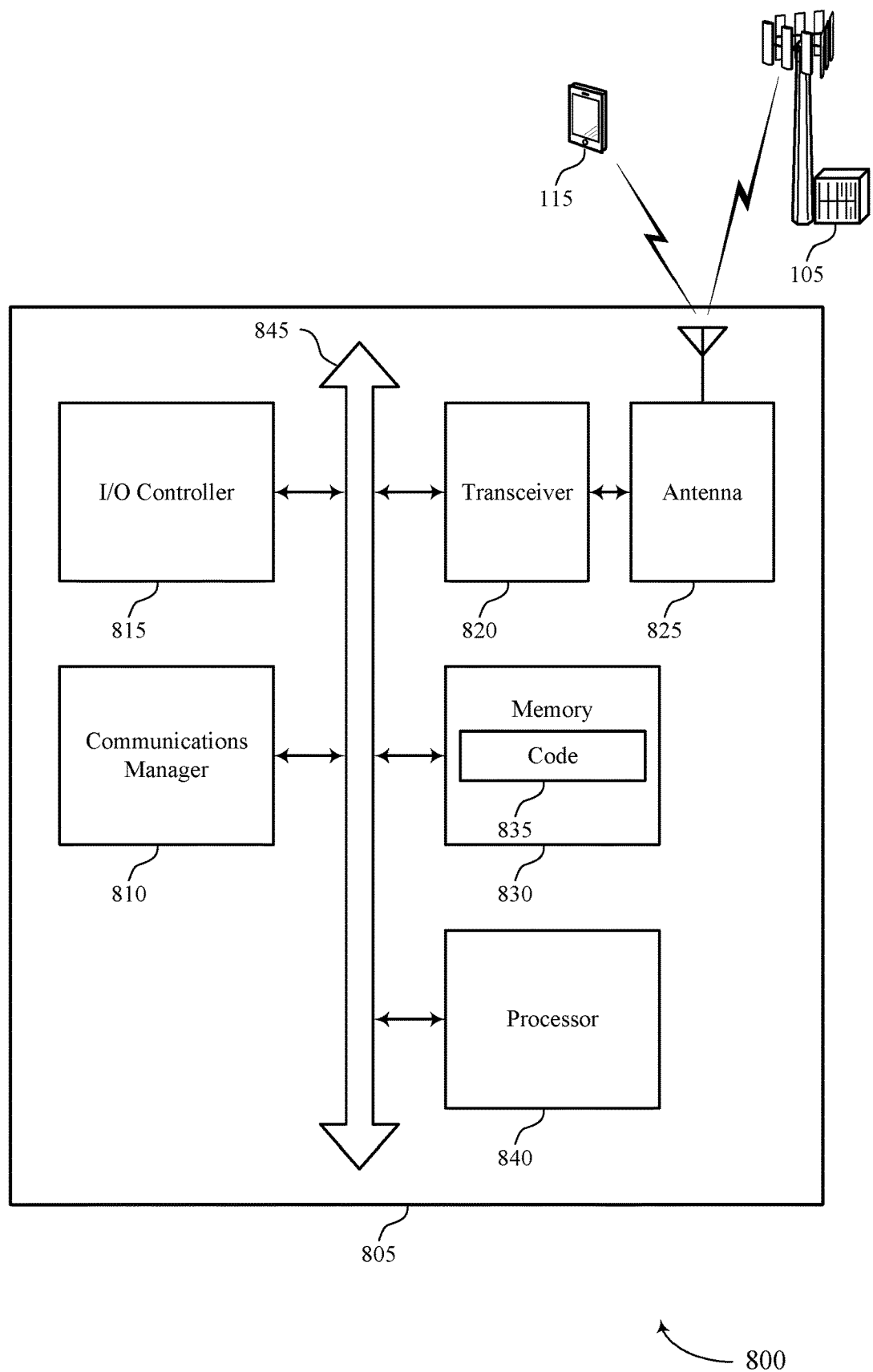
FIG. 8 shows a diagram of a system including a device that supports uplink power control prioritization in dual connectivity in accordance with aspects of the present disclosure.

FIG. 8 shows a diagram of a system 800 including a device 805 that supports uplink power control prioritization in dual connectivity in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify that the UE is operating in dual connectivity with a master cell group and a secondary cell group, determine a secondary cell group reserved transmission power for allocation across component carriers of the secondary cell group during a transmission occasion based at least in part on a secondary cell group minimum reserved transmission power for transmissions from the UE to the secondary cell group during the transmission occasion, allocate a master cell group reserved transmission power between scheduled transmissions to the master cell group during the transmission occasion based at least in part on the secondary cell group reserved transmission power and a channel type priority, allocate the secondary cell group reserved transmission power between scheduled transmissions to the secondary cell group during the transmission occasion, and communicate with the master cell group and with the secondary cell group in accordance with the power allocations.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink power control prioritization in dual connectivity).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
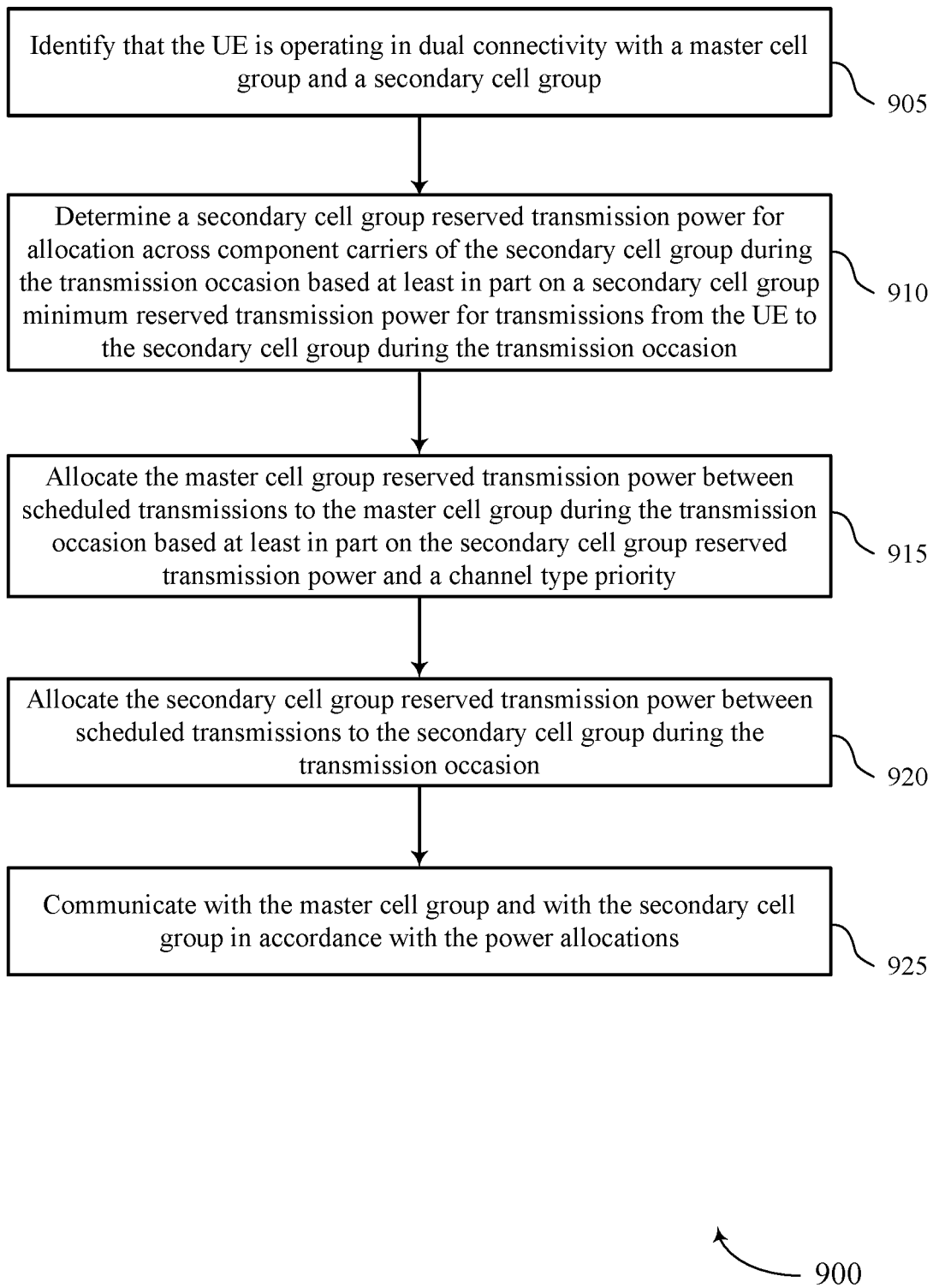
FIG. 9 shows a flowchart illustrating methods that support uplink power control prioritization in dual connectivity in accordance with aspects of the present disclosure.

FIG. 9 shows a flowchart illustrating a method 900 that supports uplink power control prioritization in dual connectivity in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally, or alternatively, a UE may perform aspects of the functions described below using special-purpose hardware.

At 905, the UE may identify that the UE is operating in dual connectivity with a master cell group and a secondary cell group. The operations of 905 may be performed according to the methods described herein. In some examples, aspects of the operations of 905 may be performed by a dual connectivity manager as described with reference to FIGS. 5 through 8.

At 910, the UE may determine a secondary cell group reserved transmission power for allocation across component carriers of the secondary cell group during the transmission occasion based at least in part on a secondary cell group minimum reserved transmission power for transmissions from the UE to the secondary cell group during the transmission occasion. The operations of 910 may be performed according to the methods described herein. In some examples, aspects of the operations of 910 may be performed by a SCG power manager as described with reference to FIGS. 5 through 8.

At 915, the UE may allocate the master cell group reserved transmission power between scheduled transmissions to the master cell group during the transmission occasion based at least in part on the secondary cell group reserved transmission power and a channel type priority. The operations of 915 may be performed according to the methods described herein. In some examples, aspects of the operations of 915 may be performed by a MCG power manager as described with reference to FIGS. 5 through 8.

At 920, the UE may allocate the secondary cell group reserved transmission power between scheduled transmissions to the secondary cell group during the transmission occasion. The operations of 920 may be performed according to the methods described herein. In some examples, aspects of the operations of 920 may be performed by a SCG power manager as described with reference to FIGS. 5 through 8.

At 925, the UE may communicate with the master cell group and with the secondary cell group in accordance with the power allocations. The operations of 925 may be performed according to the methods described herein. In some examples, aspects of the operations of 925 may be performed by a dual connectivity manager as described with reference to FIGS. 5 through 8.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible examples, and other examples will be readily apparent to those skilled in the art without departing from the scope of the disclosure.

Example 1

A method for wireless communications at a UE, comprising: identifying that the UE is operating in dual connectivity with a master cell group and a secondary cell group; determining a secondary cell group reserved transmission power for allocation across component carriers of the secondary cell group during a transmission occasion based at least in part on a secondary cell group minimum reserved transmission power for transmissions from the UE to the secondary cell group during the transmission occasion; allocating a master cell group reserved transmission power between scheduled transmissions to the master cell group during the transmission occasion based at least in part on the secondary cell group reserved transmission power and a channel type priority; allocating the secondary cell group reserved transmission power between scheduled transmissions to the secondary cell group during the transmission occasion; and communicating with the master cell group and with the secondary cell group in accordance with the power allocation.

Example 2

The method of example 1, further comprising: identifying the secondary cell group minimum reserved transmission power for the transmissions from the UE to the secondary cell group during the transmission occasion; and determining the master cell group reserved transmission power, the master cell group reserved transmission power for allocation across component carriers of the master cell group during the transmission occasion.

Example 3

The method of examples 1 or 2, wherein determining the master cell group reserved transmission power comprises: determining that a master cell group total scheduled transmission power is less than or equal to a difference between a total available transmission power and the secondary cell group minimum reserved transmission power; and setting the master cell group reserved transmission power equal to the master cell group total scheduled transmission power based at least in part on the master cell group total scheduled transmission power being less than or equal to the difference.

Example 4

The method of examples 1 or 2, wherein determining the master cell group reserved transmission power comprises: determining that a master cell group total scheduled transmission power is greater than a difference between a total available transmission power and the secondary cell group minimum reserved transmission power; determining that no transmission is scheduled to the secondary cell group during the transmission occasion; and setting the master cell group reserved transmission power equal to the master cell group total scheduled transmission power based at least in part on the master cell group total scheduled transmission power being greater than the difference and a lack of scheduled transmissions to the secondary cell group during the transmission occasion.

Example 5

The method of examples 1 or 2, wherein determining the master cell group reserved transmission power comprises: determining that a master cell group total scheduled transmission power is greater than a difference between a total available transmission power and the secondary cell group minimum reserved transmission power; determining that at least one transmission is scheduled to the secondary cell group during the transmission occasion; determining that a secondary cell group total scheduled transmission power is less than the secondary cell group minimum reserved transmission power; and setting the master cell group reserved transmission power equal to a difference between the total available transmission power and the secondary cell group total scheduled transmission power.

Example 6

The method of examples 1 or 2, wherein determining the master cell group reserved transmission power comprises: determining that a master cell group total scheduled transmission power is greater than a difference between a total available transmission power and the secondary cell group minimum reserved transmission power; determining that at least one transmission is scheduled to the secondary cell group during the transmission occasion; determining that a secondary cell group total scheduled transmission power is greater than or equal to the secondary cell group minimum reserved transmission power; and setting the master cell group reserved transmission power equal to a difference between the total available transmission power and the secondary cell group minimum reserved transmission power.

Example 7

The method of any of examples 1 through 6, further comprising: identifying a master cell group minimum reserved transmission power for transmissions from the UE to the master cell group during the transmission occasion.

Example 8

The method of any of examples 1 through 7, wherein allocating the master cell group reserved transmission power between scheduled transmissions to the master cell group during the transmission occasion comprises: allocating the master cell group reserved transmission power between scheduled transmissions to the master cell group based at least in part on a priority of the scheduled transmissions.

Example 9

The method of any of examples 1 through 8, wherein allocating the secondary cell group reserved transmission power between scheduled transmissions to the secondary cell group during the transmission occasion comprises: allocating the secondary cell group reserved transmission power between scheduled transmissions to the secondary cell group based at least in part on a priority of the scheduled transmissions.

Example 10

The method of any of examples 1 through 9, wherein the scheduled transmissions to the master cell group include ultra-reliable low-latency communications, and wherein the scheduled transmissions to the secondary cell group do not include ultra-reliable low-latency communications.

Example 11

The method of any of examples 1 through 10, further comprising: identifying the secondary cell group minimum reserved transmission power for transmissions from the UE to the secondary cell group during the transmission occasion; determining a secondary cell group ultra-reliable low-latency communications total scheduled transmission power during the transmission occasion; and determining that a master cell group total scheduled transmission power is less than or equal to a difference between a total available transmission power and the secondary cell group minimum reserved transmission power.

Example 12

The method of any of examples 1 through 11, wherein determining the secondary cell group reserved transmission power comprises: scaling down a power of non-ultra-reliable low-latency communications with the secondary cell group during the transmission occasion; determining that a sum of the scaled down power of the non-ultra-reliable low-latency communications with the secondary cell group and the secondary cell group ultra-reliable low-latency communications is less than or equal to the secondary cell group minimum reserved transmission power; and setting the secondary cell group reserved transmission power to be equal to the secondary cell group minimum reserved transmission power.

Example 13

The method of any of examples 1 through 12, wherein determining the secondary cell group reserved transmission power comprises: scaling down a power of non-ultra-reliable low-latency communications with the secondary cell group during the transmission occasion; determining that a sum of the scaled down power of non-ultra-reliable low-latency communications with the secondary cell group and the secondary cell group ultra-reliable low-latency communications is greater than the secondary cell group minimum reserved transmission power; identifying that the scheduled transmissions to the master cell group do not include ultra-reliable low-latency communications; scaling down the master cell group reserved transmission power based at least in part on a lack of ultra-reliable low-latency communications being scheduled during the transmission occasion; and setting the secondary cell group reserved transmission power to be equal to at least the secondary cell group ultra-reliable low-latency communications total scheduled transmission power.

Example 14

The method of any of examples 1 through 13, further comprising: scaling down a power of non-ultra-reliable low-latency communications with the secondary cell group during the transmission occasion; determining that a sum of the scaled down power of non-ultra-reliable low-latency communications with the secondary cell group and the secondary cell group ultra-reliable low-latency communications is greater than the secondary cell group minimum reserved transmission power; identifying that the scheduled transmissions to the master cell group include ultra-reliable low-latency communications; and scaling down selected transmission powers in order so that ultra-reliable low-latency communications with the master cell group are prioritized.

Example 15

The method of example 14, wherein the order for scaling down the selected transmission powers comprises: scaling down the secondary cell group reserved transmission power to be equal to the secondary cell group minimum reserved transmission power, followed by scaling down non-ultra-reliable low-latency communications with the master cell group, and followed by scaling down ultra-reliable low-latency communications with the master cell group.

Example 16

The method of example 14, wherein the order for scaling down the selected transmission powers comprises: scaling down non-ultra-reliable low-latency communications with the master cell group, followed by scaling down ultra-reliable low-latency communications with the secondary cell group, and followed by scaling down ultra-reliable low-latency communications with the master cell group.

Example 17

The method of any of examples 1 through 16, further comprising: identifying the secondary cell group minimum reserved transmission power for transmissions from the UE to the secondary cell group during the transmission occasion; determining a secondary cell group ultra-reliable low-latency communications total scheduled transmission power during the transmission occasion; determining that a master cell group total scheduled transmission power is greater than a difference between a total available transmission power and the secondary cell group minimum reserved transmission power; and scaling down communications with the master cell group so that the master cell group reserved transmission power is equal to the difference between the total available transmission power and the secondary cell group minimum reserved transmission power.

Example 18

The method of any of examples 1 through 17, further comprising: identifying a master cell group minimum reserved transmission power for non-ultra-reliable low-latency communications for non-ultra-reliable low-latency transmissions from the UE to the master cell group during the transmission occasion; identifying a master cell group minimum reserved transmission power for ultra-reliable low-latency communications for ultra-reliable low-latency transmissions from the UE to the master cell group during the transmission occasion; identifying the secondary cell group minimum reserved transmission power for non-ultra-reliable low-latency communications for non-ultra-reliable low-latency transmissions from the UE to the secondary cell group during the transmission occasion; and identifying a secondary cell group minimum reserved transmission power for ultra-reliable low-latency communications for ultra-reliable low-latency transmissions from the UE to the secondary cell group during the transmission occasion.

Example 19

The method of any of examples 1 through 18, wherein the master cell group minimum reserved transmission power for non-ultra-reliable low-latency communications is independent from the master cell group minimum reserved transmission power for ultra-reliable low-latency communications, and wherein the secondary cell group minimum reserved transmission power for non-ultra-reliable low-latency communications is independent from the secondary cell group minimum reserved transmission power for ultra-reliable low-latency communications.

Example 20

The method of any of examples 1 through 19, further comprising: identifying that the UE is power-limited.

Example 21

The method of any of examples 1 through 20, further comprising: identifying that communications with the master cell group have a higher priority than communications with the secondary cell group.

Example 22

The method of any of examples 1 through 21, wherein determining the secondary cell group reserved transmission power comprises: scaling down the secondary cell group reserved transmission power based at least in part on the communications with the master cell group having the higher priority than the communications with the secondary cell group.

Example 23

The method of any of examples 1 through 21, wherein the channel type priority comprises at least one of a non-ultra-reliable low-latency communication with the master cell group, an ultra-reliable low-latency communication with the secondary cell group, or an ultra-reliable low-latency communication with the master cell group.

Example 24

An apparatus comprising at least one means for performing a method of any of examples 1 to 23.

Example 25

An apparatus for wireless communications comprising: a processor; memory coupled with the processor; and instructions stored in the memory and executable by the processor to cause the apparatus to perform a method of any of examples 1 to 23.

Example 26

A non-transitory computer-readable medium storing code for wireless communications, the code comprising instructions executable by a processor to perform a method of any of examples 1 to 23.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying that the UE is operating in dual connectivity with a master cell group and a secondary cell group;
   determining a secondary cell group transmission power for allocation across component carriers of the secondary cell group during a transmission occasion based at least in part on a secondary cell group reserved transmission power for transmissions from the UE to the secondary cell group during the transmission occasion;
   determining a master cell group reserved transmission power for allocation across component carriers of the master cell group during the transmission occasion;
   allocating the master cell group reserved transmission power to the master cell group and the secondary cell group transmission power to the secondary cell group, wherein the allocation of the master cell group reserved transmission power is independent from the allocation of the secondary cell group transmission power;
   allocating, within the master cell group, the master cell group reserved transmission power between a first plurality of scheduled transmissions to the master cell group during the transmission occasion;
   allocating, within the secondary cell group, the secondary cell group transmission power between a second plurality of scheduled transmissions to the secondary cell group during the transmission occasion; and
   communicating with the master cell group and with the secondary cell group during the transmission occasion in accordance with the allocating.

2. The method of claim 1, wherein determining the master cell group reserved transmission power is based at least in part on a channel type priority that comprises at least one of a non-ultra-reliable low-latency communication with the master cell group or an ultra-reliable low-latency communication with the master cell group.

3. The method of claim 1, further comprising:
identifying the secondary cell group reserved transmission power for the second plurality of scheduled transmissions from the UE to the secondary cell group, wherein determining the secondary cell group transmission power is based at least in part on identifying the secondary cell group reserved transmission power.

4. The method of claim 1, wherein determining the master cell group reserved transmission power comprises:
determining that a master cell group total scheduled transmission power is less than or equal to a difference between a total available transmission power and the secondary cell group reserved transmission power; and
setting the master cell group reserved transmission power equal to the master cell group total scheduled transmission power based at least in part on the master cell group total scheduled transmission power being less than or equal to the difference.

5. The method of claim 1, wherein determining the master cell group reserved transmission power comprises:
determining that a master cell group total scheduled transmission power is greater than a difference between a total available transmission power and the secondary cell group reserved transmission power;
determining that at least one transmission of the second plurality of scheduled transmissions is scheduled to the secondary cell group during the transmission occasion;
determining that a secondary cell group total scheduled transmission power is less than the secondary cell group reserved transmission power; and
setting the master cell group reserved transmission power equal to a difference between the total available transmission power and the secondary cell group total scheduled transmission power.

6. The method of claim 1, wherein determining the master cell group reserved transmission power comprises:
determining that a master cell group total scheduled transmission power is greater than a difference between a total available transmission power and the secondary cell group reserved transmission power;
determining that at least one transmission of the second plurality of scheduled transmissions is scheduled to the secondary cell group during the transmission occasion;
determining that a secondary cell group total scheduled transmission power is greater than or equal to the secondary cell group reserved transmission power; and
setting the master cell group reserved transmission power equal to a difference between the total available transmission power and the secondary cell group reserved transmission power.

7. The method of claim 1, further comprising:
identifying a master cell group reserved transmission power for the first plurality of scheduled transmissions from the UE to the master cell group, wherein determining the master cell group reserved transmission power is based at least in part on identifying the master cell group reserved transmission power.

8. The method of claim 1, wherein allocating the master cell group reserved transmission power between the first plurality of scheduled transmissions to the master cell group during the transmission occasion comprises:
allocating the master cell group reserved transmission power between the first plurality of scheduled transmissions to the master cell group based at least in part on a priority of each scheduled transmission of the first plurality of scheduled transmissions.

9. The method of claim 1, wherein allocating the secondary cell group transmission power between the second plurality of scheduled transmissions to the secondary cell group during the transmission occasion comprises:
allocating the secondary cell group transmission power between the second plurality of scheduled transmissions to the secondary cell group based at least in part on a priority of each scheduled transmission of the second plurality of scheduled transmissions.

10. The method of claim 1, wherein the first plurality of scheduled transmissions to the master cell group include ultra-reliable low-latency communications, and wherein the second plurality of scheduled transmissions to the secondary cell group do not include ultra-reliable low-latency communications.

11. The method of claim 1, further comprising:
identifying the secondary cell group reserved transmission power for the second plurality of scheduled transmissions from the UE to the secondary cell group during the transmission occasion;
determining a secondary cell group ultra-reliable low-latency communications total scheduled transmission power during the transmission occasion; and
determining that a master cell group total scheduled transmission power is less than or equal to a difference between a total available transmission power and the secondary cell group reserved transmission power.

12. The method of claim 11, wherein determining the secondary cell group transmission power comprises:
scaling down a power of non-ultra-reliable low-latency communications with the secondary cell group during the transmission occasion;
determining that a sum of the scaled down power of the non-ultra-reliable low-latency communications with the secondary cell group and the secondary cell group ultra-reliable low-latency communications total scheduled transmission power is less than or equal to the secondary cell group reserved transmission power; and
setting the secondary cell group transmission power to be equal to the secondary cell group reserved transmission power.

13. The method of claim 1, further comprising:
identifying a master cell group reserved transmission power for non-ultra-reliable low-latency communications for non-ultra-reliable low-latency transmissions from the UE to the master cell group during the transmission occasion;
identifying a master cell group reserved transmission power for ultra-reliable low-latency communications for ultra-reliable low-latency transmissions from the UE to the master cell group during the transmission occasion;
identifying the secondary cell group reserved transmission power for non-ultra-reliable low-latency communications for non-ultra-reliable low-latency transmissions from the UE to the secondary cell group during the transmission occasion; and
identifying a secondary cell group reserved transmission power for ultra-reliable low-latency communications for ultra-reliable low-latency transmissions from the UE to the secondary cell group during the transmission occasion.

14. The method of claim 13, wherein the master cell group reserved transmission power for non-ultra-reliable low-latency communications is independent from the master cell group reserved transmission power for ultra-reliable low-latency communications, and wherein the secondary cell group reserved transmission power for non-ultra-reliable low-latency communications is independent from the secondary cell group reserved transmission power for ultra-reliable low-latency communications.

15. The method of claim 1, further comprising:
identifying that the UE is power-limited.

16. The method of claim 1, further comprising:
identifying that communications with the master cell group have a higher priority than communications with the secondary cell group.

17. The method of claim 1, wherein the secondary cell group transmission power is based at least in part on the master cell group reserved transmission power.

18. The method of claim 1, wherein operating in dual connectivity comprises performing dynamic power control in a dual connectivity mode.

19. The method of claim 1, wherein determining the secondary cell group transmission power comprises determining that a transmission on the secondary cell group overlaps with a transmission on the master cell group in at least one symbol.

20. The method of claim 1, wherein determining the secondary cell group transmission power comprises determining that the secondary cell group transmission power is less than or equal to the difference between a total transmit power available for uplink transmissions and the master cell group reserved transmission power.

21. An apparatus for wireless communication at a user equipment (UE), comprising:
a processor,
memory coupled with the processor; and
instructions stored in the memory and executable by the processor to cause the apparatus to:
identify that the UE is operating in dual connectivity with a master cell group and a secondary cell group;
determine a secondary cell group transmission power for allocation across component carriers of the secondary cell group during a transmission occasion based at least in part on a secondary cell group reserved transmission power for transmissions from the UE to the secondary cell group during the transmission occasion;
determine a master cell group reserved transmission power for allocation across component carriers of the master cell group during the transmission occasion based at least in part on the secondary cell group transmission power;
allocate the master cell group reserved transmission power to the master cell group and the secondary cell group transmission power to the secondary cell group, wherein the allocation of the master cell group reserved transmission power is independent from the allocation of the secondary cell group transmission power;
allocate, within the master cell group, the master cell group reserved transmission power between a first plurality of scheduled transmissions to the master cell group during the transmission occasion;
allocate, within the secondary cell group, the secondary cell group transmission power between a second plurality of scheduled transmissions to the secondary cell group during the transmission occasion; and
communicate with the master cell group and with the secondary cell group during the transmission occasion in accordance with the allocating.

22. The apparatus of claim 21, wherein the instructions are further executable by the processor to cause the apparatus to:
identify the secondary cell group reserved transmission power for the second plurality of scheduled transmissions from the UE to the secondary cell group, wherein the secondary cell group transmission power is based at least in part on the identified secondary cell group reserved transmission power.

23. The apparatus of claim 21, wherein the instructions to determine the master cell group reserved transmission power are executable by the processor to cause the apparatus to:
determine that a master cell group total scheduled transmission power is less than or equal to a difference between a total available transmission power and the secondary cell group reserved transmission power; and
set the master cell group reserved transmission power equal to the master cell group total scheduled transmission power based at least in part on the master cell group total scheduled transmission power being less than or equal to the difference.

24. The apparatus of claim 21, wherein the instructions to determine the master cell group reserved transmission power are executable by the processor to cause the apparatus to:
determine that a master cell group total scheduled transmission power is greater than a difference between a total available transmission power and the secondary cell group reserved transmission power;
determine that at least one transmission of the second plurality of scheduled transmissions is scheduled to the secondary cell group during the transmission occasion;
determine that a secondary cell group total scheduled transmission power is less than the secondary cell group reserved transmission power; and
set the master cell group reserved transmission power equal to a difference between the total available transmission power and the secondary cell group total scheduled transmission power.

25. An apparatus for wireless communication at a user equipment (UE), comprising:
means for identifying that the UE is operating in dual connectivity with a master cell group and a secondary cell group;
means for determining a secondary cell group transmission power for allocation across component carriers of the secondary cell group during a transmission occasion based at least in part on a secondary cell group reserved transmission power for transmissions from the UE to the secondary cell group during the transmission occasion;
means for determining a master cell group reserved transmission power for allocation across component carriers of the master cell group during the transmission occasion based at least in part on the secondary cell group transmission power;
means for allocating the master cell group reserved transmission power to the master cell group and the secondary cell group transmission power to the secondary cell group, wherein the allocation of the master cell group reserved transmission power is independent from the allocation of the secondary cell group transmission power;
means for allocating, within the master cell group, the master cell group reserved transmission power between a first plurality of scheduled transmissions to the master cell group during the transmission occasion;

means for allocating, within the secondary cell group, the secondary cell group transmission power between a second plurality of scheduled transmissions to the secondary cell group during the transmission occasion; and means for communicating with the master cell group and with the secondary cell group during the transmission occasion in accordance with the allocating.

26. A non-transitory computer-readable medium storing code for wireless communication at a user equipment (UE), the code comprising instructions executable by a processor to:

identify that the UE is operating in dual connectivity with a master cell group and a secondary cell group;

determine a secondary cell group transmission power for allocation across component carriers of the secondary cell group during a transmission occasion based at least in part on a secondary cell group reserved transmission power for transmissions from the UE to the secondary cell group during the transmission occasion;

determine a master cell group reserved transmission power for allocation across component carriers of the master cell group during the transmission occasion based at least in part on the secondary cell group transmission power;

allocate the master cell group reserved transmission power to the master cell group and the secondary cell group transmission power to the secondary cell group, wherein the allocation of the master cell group reserved transmission power is independent from the allocation of the secondary cell group transmission power;

allocate, within the master cell group, the master cell group reserved transmission power between a first plurality of scheduled transmissions to the master cell group during the transmission occasion;

allocate, within the secondary cell group, the secondary cell group transmission power between a second plurality of scheduled transmissions to the secondary cell group during the transmission occasion; and communicate with the master cell group and with the secondary cell group during the transmission occasion in accordance with the allocating.

27. The apparatus of claim 21, wherein the secondary cell group transmission power is based at least in part on the master cell group reserved transmission power.

28. The apparatus of claim 21, wherein the secondary cell group reserved transmission power is based at least in part on a maximum transmission power for dual connectivity operation.

29. The apparatus of claim 21, wherein the instructions are further executable by the processor to cause the apparatus to:

determine that a symbol of a first transmission on the secondary cell group overlaps with a second transmission on the master cell group during the transmission occasion.

30. The apparatus of claim 21, wherein the instructions are further executable by the processor to cause the apparatus to:

determine that the secondary cell group transmission power is less than or equal to the difference between a total transmit power available for uplink transmissions and the master cell group reserved transmission power.

* * * * *